Figure 1:
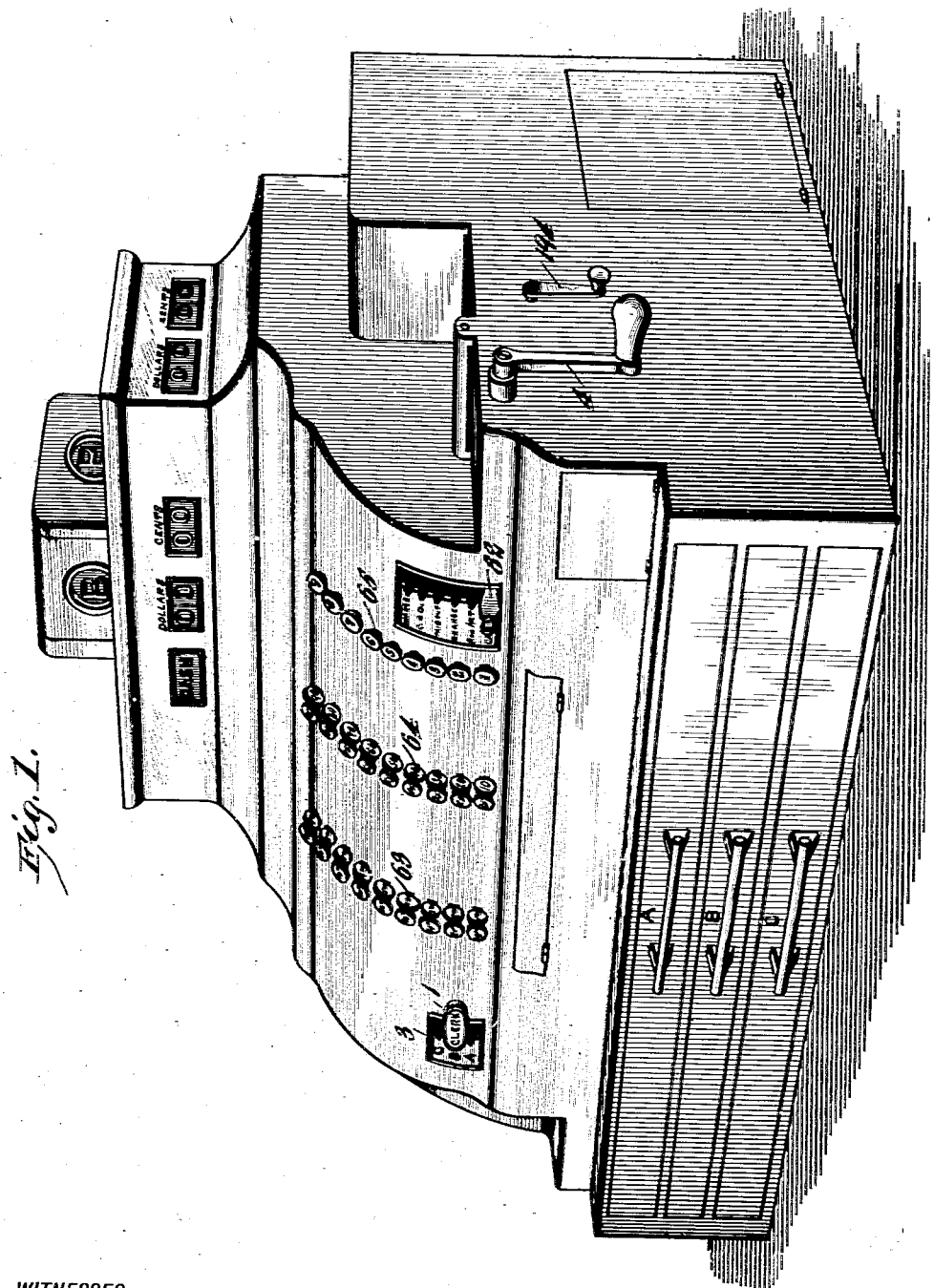

J. F. PARKER.
CASH REGISTER, INDICATOR, AND RECORDER.
APPLICATION FILED AUG. 1, 1908.

913,550.

Patented Feb. 23, 1909.
16 SHEETS—SHEET 1.

WITNESSES
E. M. Callaghan
Amos W. Hart

INVENTOR
JOHN F. PARKER
BY Munn & Co.
ATTORNEYS

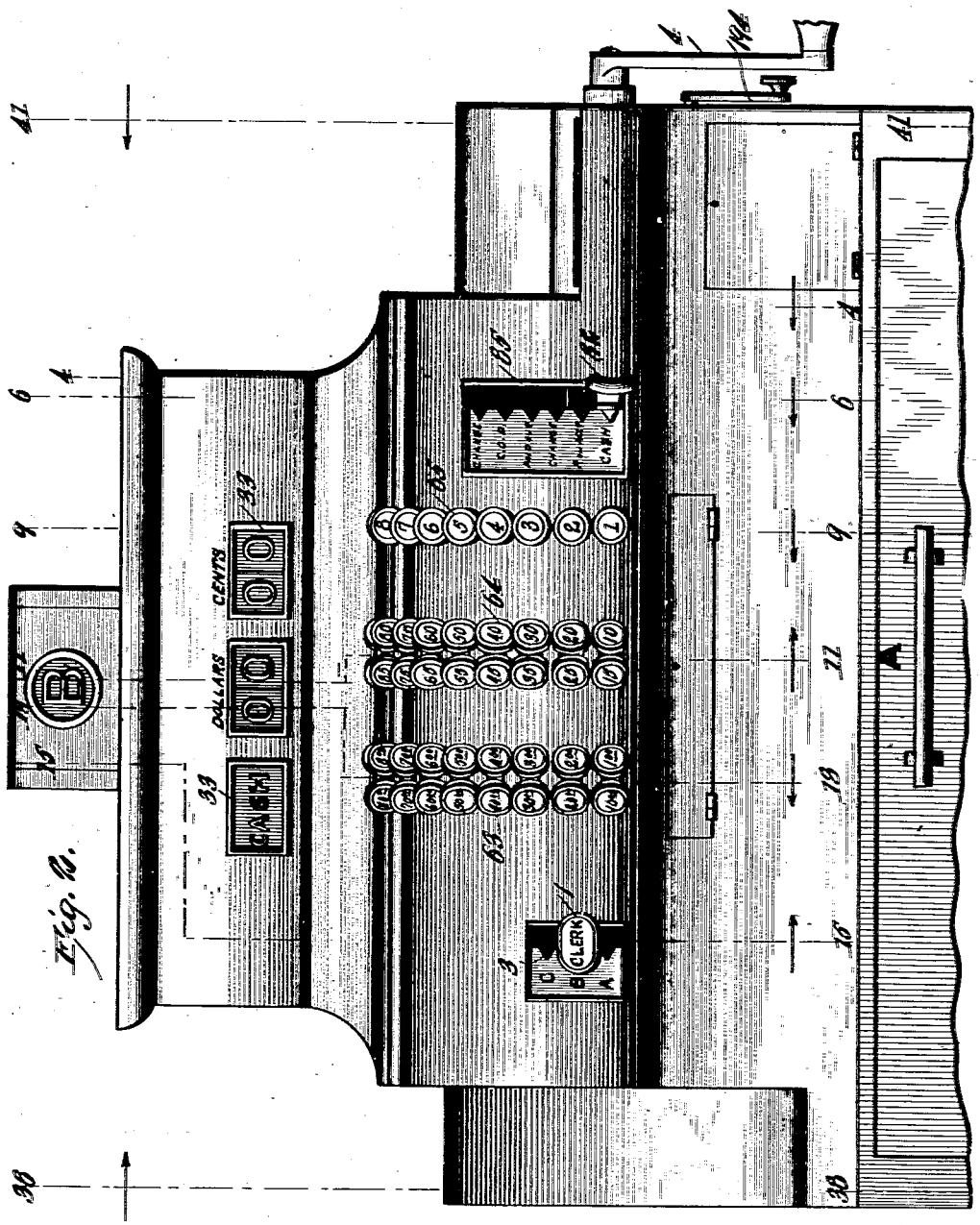

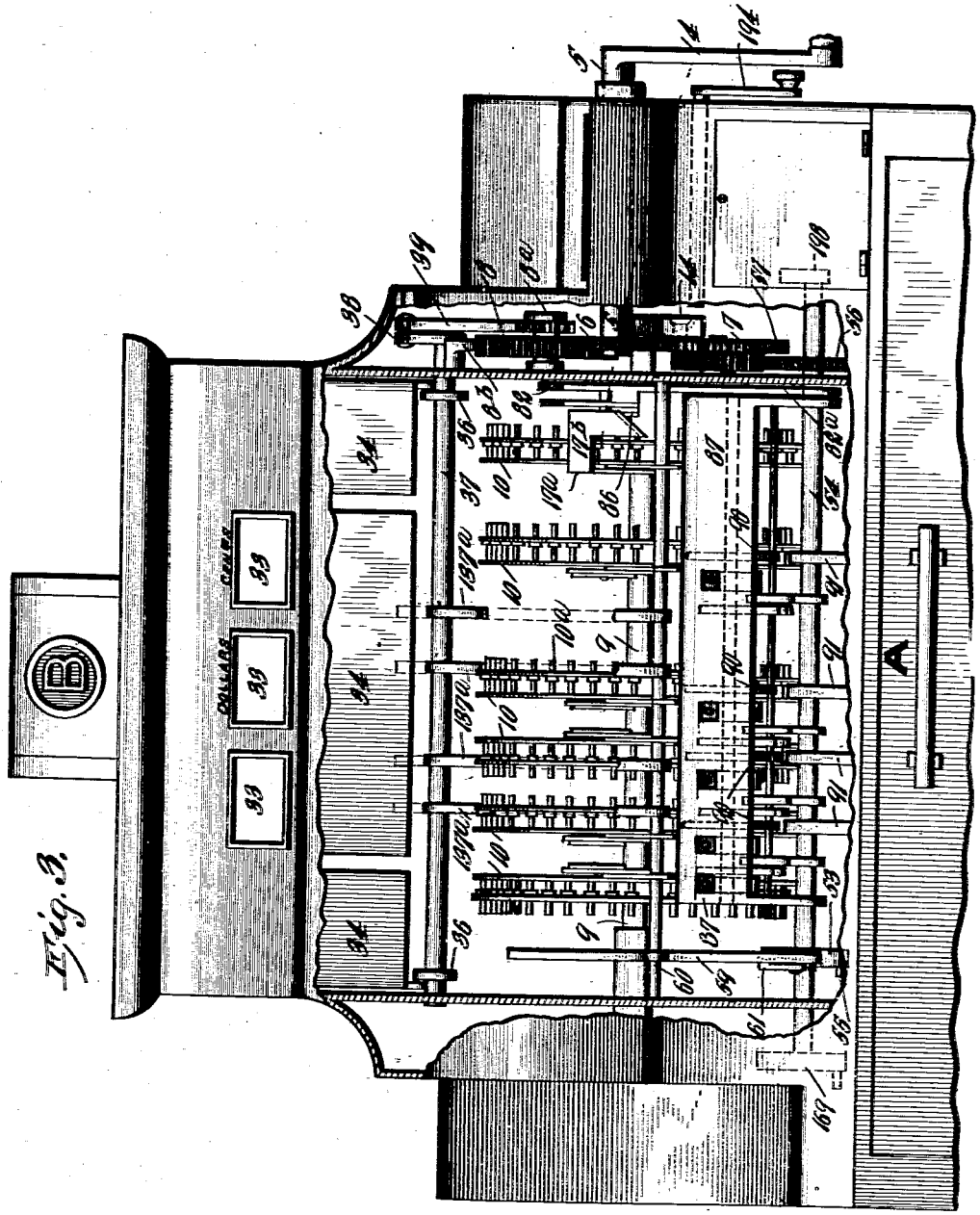

J. F. PARKER.
CASH REGISTER, INDICATOR, AND RECORDER.
APPLICATION FILED AUG. 1, 1908.
No. 913,550.
Patented Feb. 23, 1909.
16 SHEETS—SHEET 4.
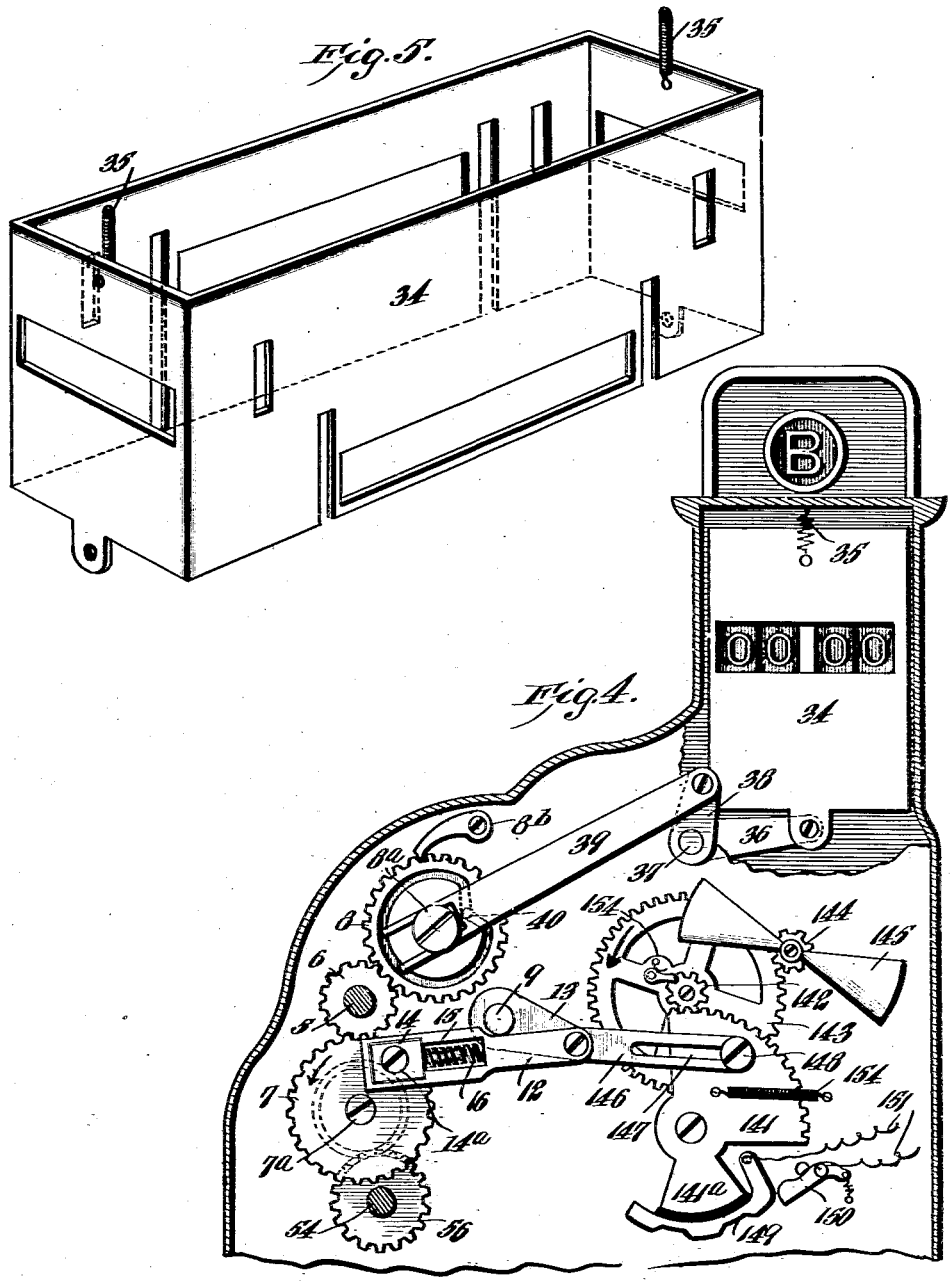
WITNESSES
E. M. Callaghan
Amos W. Hart
INVENTOR
JOHN F. PARKER
BY Munn & Co.
ATTORNEYS.

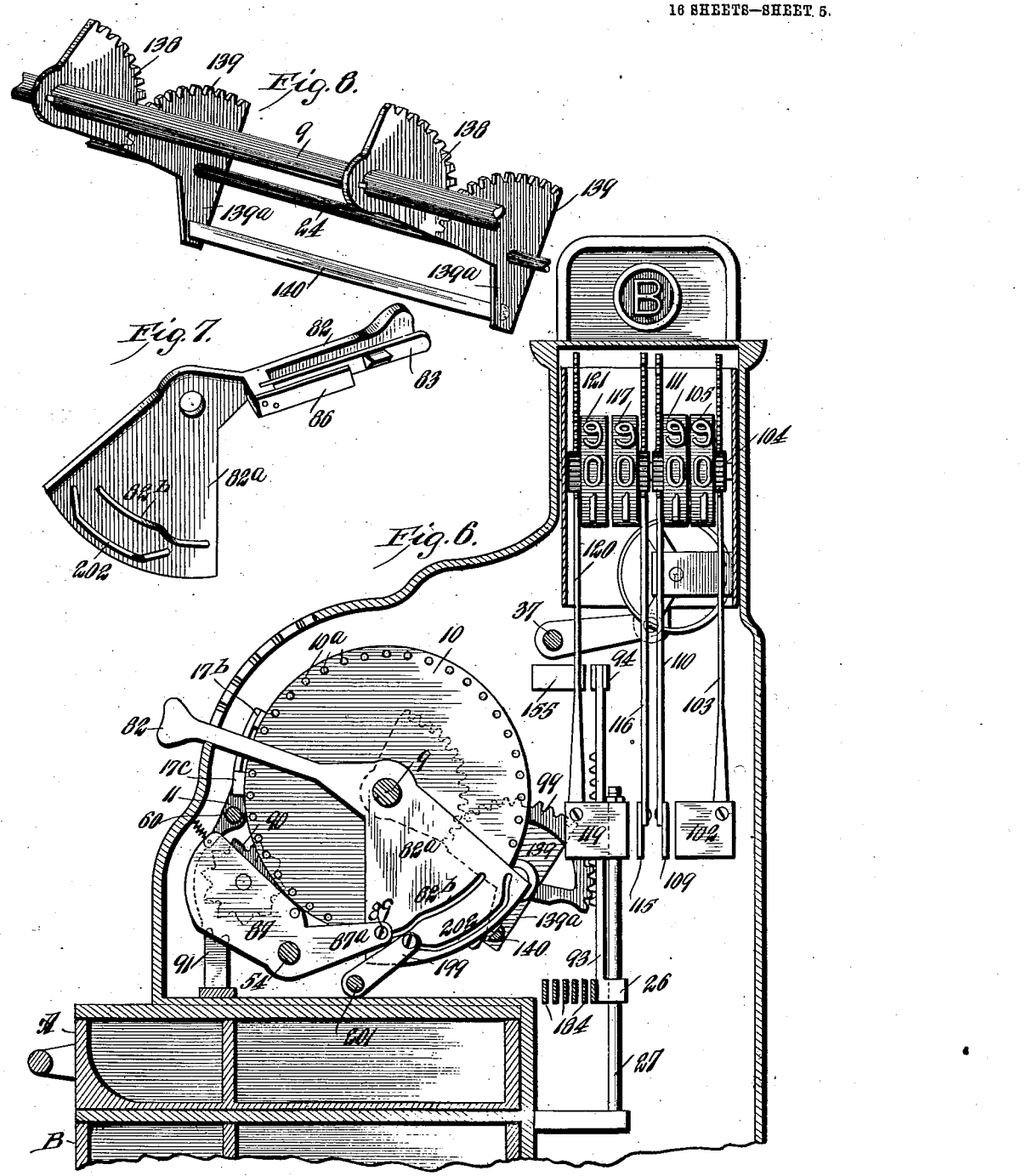

J. F. PARKER.
CASH REGISTER, INDICATOR, AND RECORDER.
APPLICATION FILED AUG. 1, 1908.
913,550.
Patented Feb. 23, 1909.
16 SHEETS—SHEET 6.
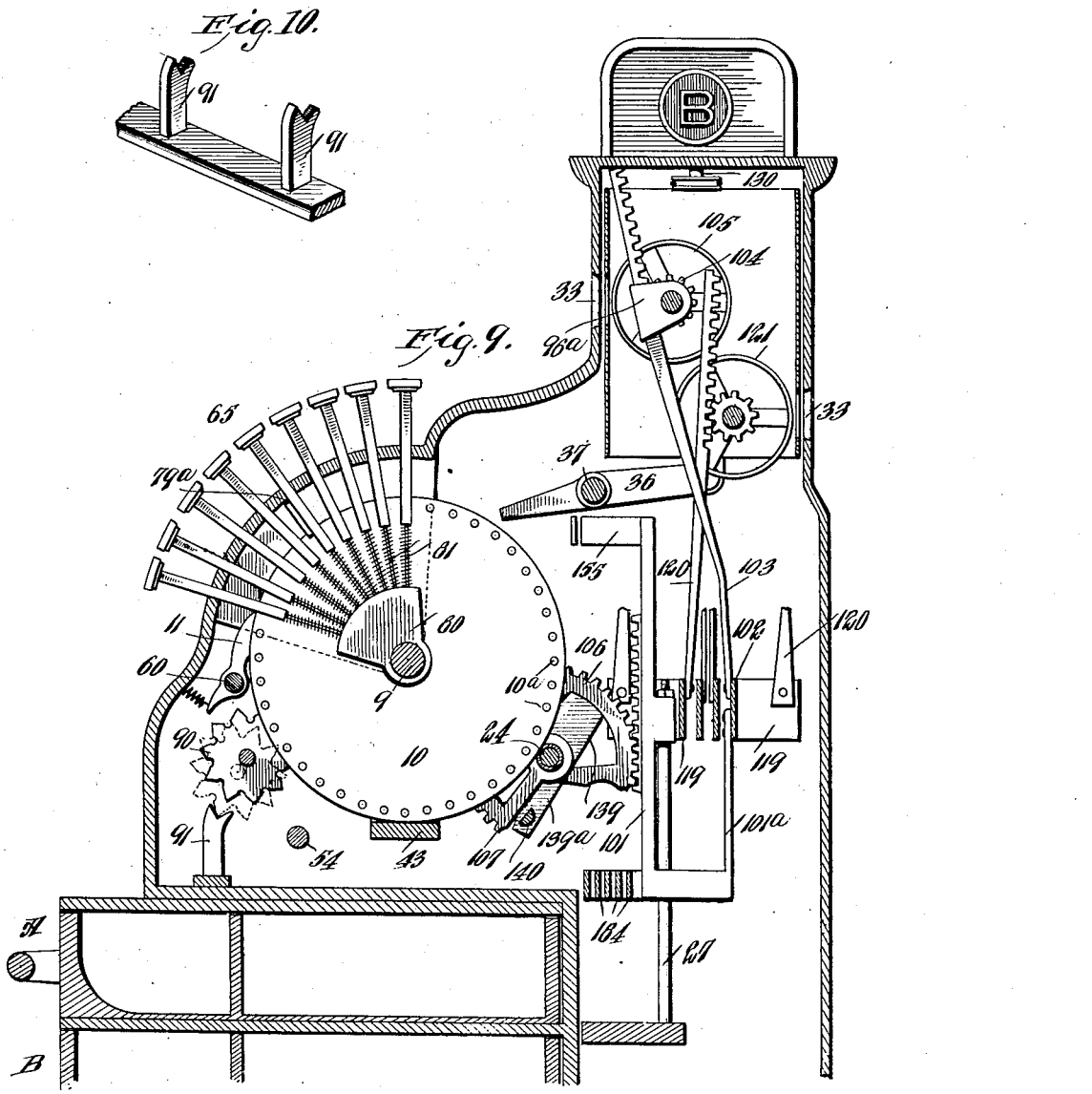
WITNESSES
INVENTOR
JOHN F. PARKER
BY
ATTORNEYS

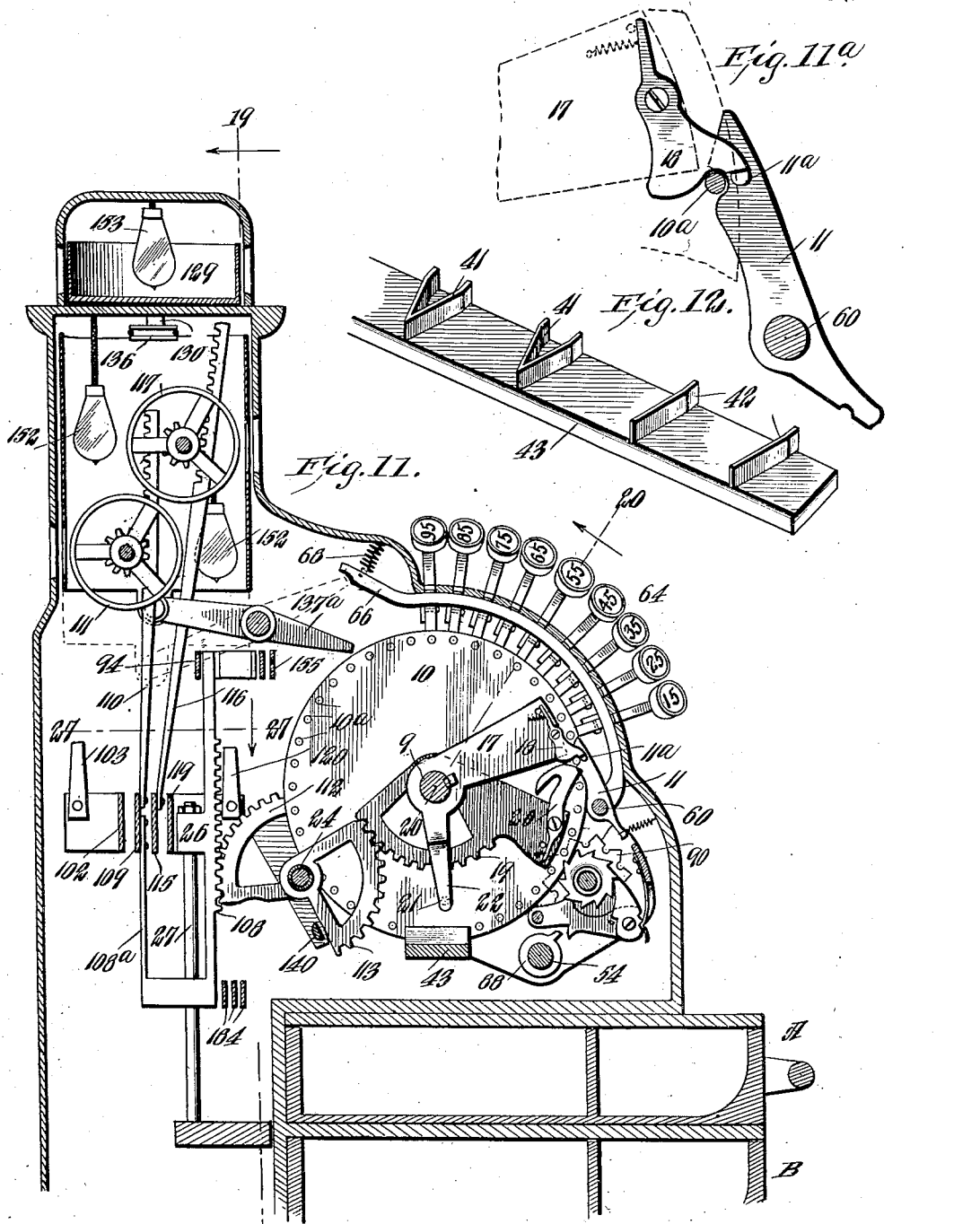

J. F. PARKER.
CASH REGISTER, INDICATOR, AND RECORDER.
APPLICATION FILED AUG. 1, 1908.
913,550.
Patented Feb. 23, 1909.
16 SHEETS—SHEET 8.
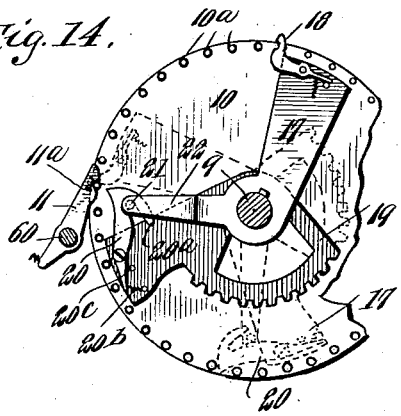
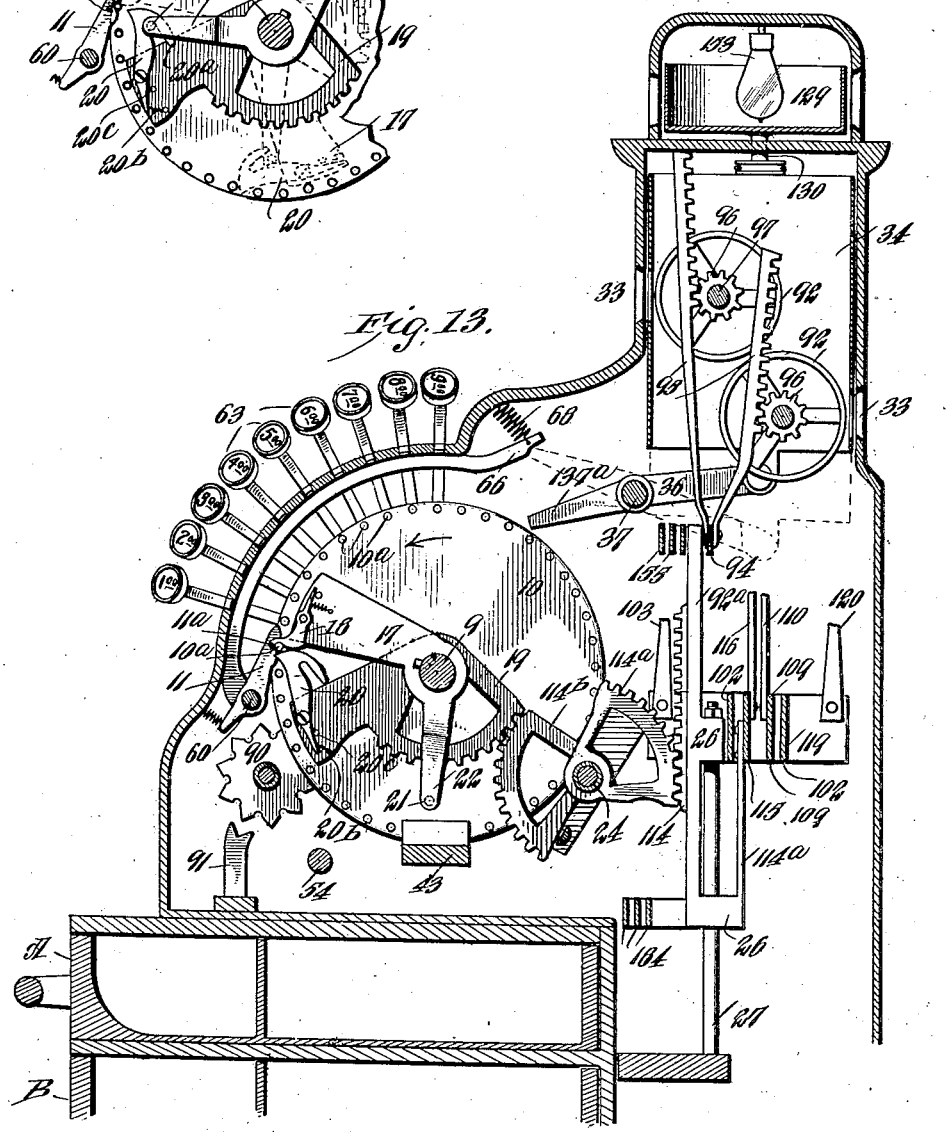
WITNESSES
INVENTOR
JOHN F. PARKER
BY
ATTORNEYS

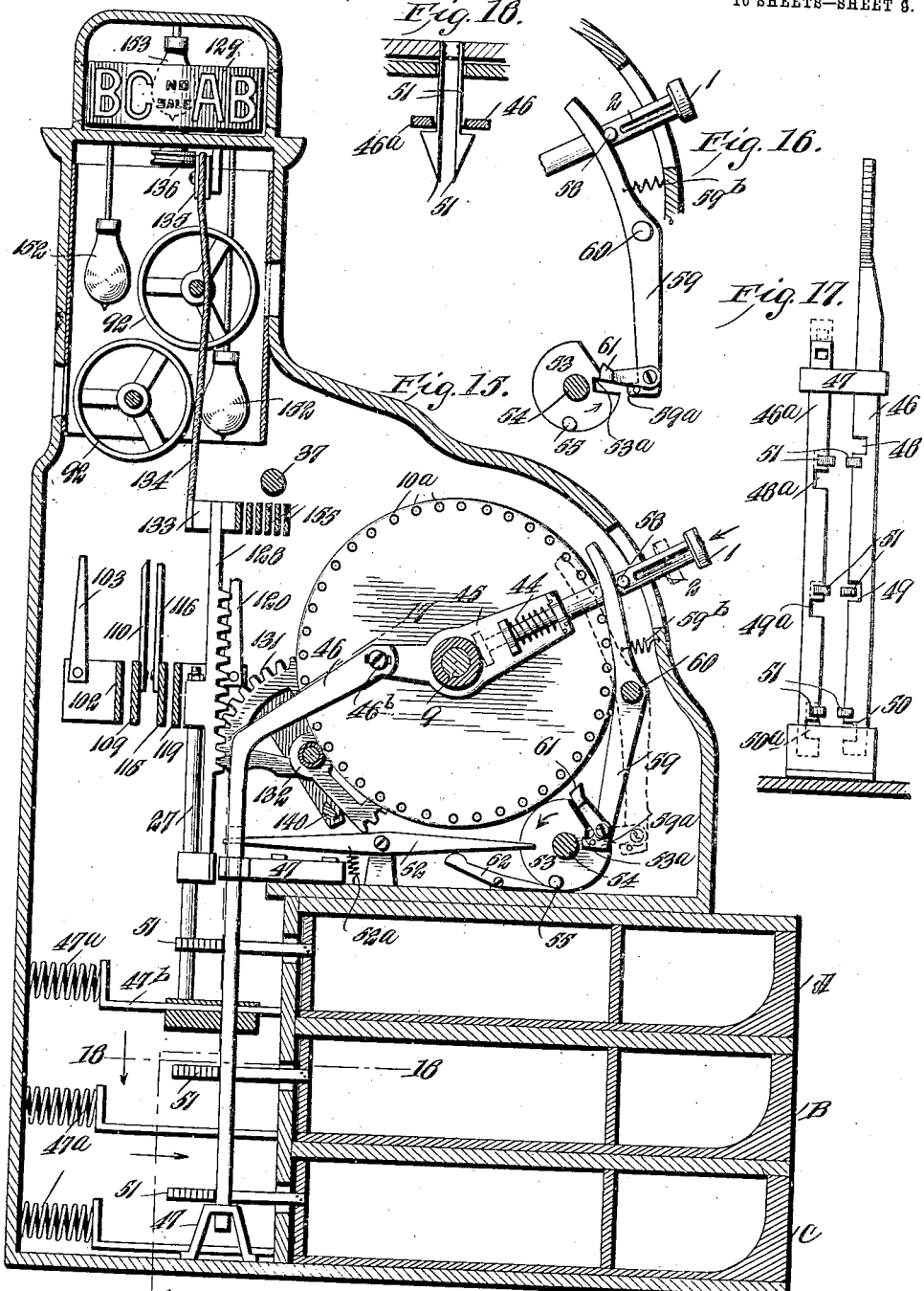

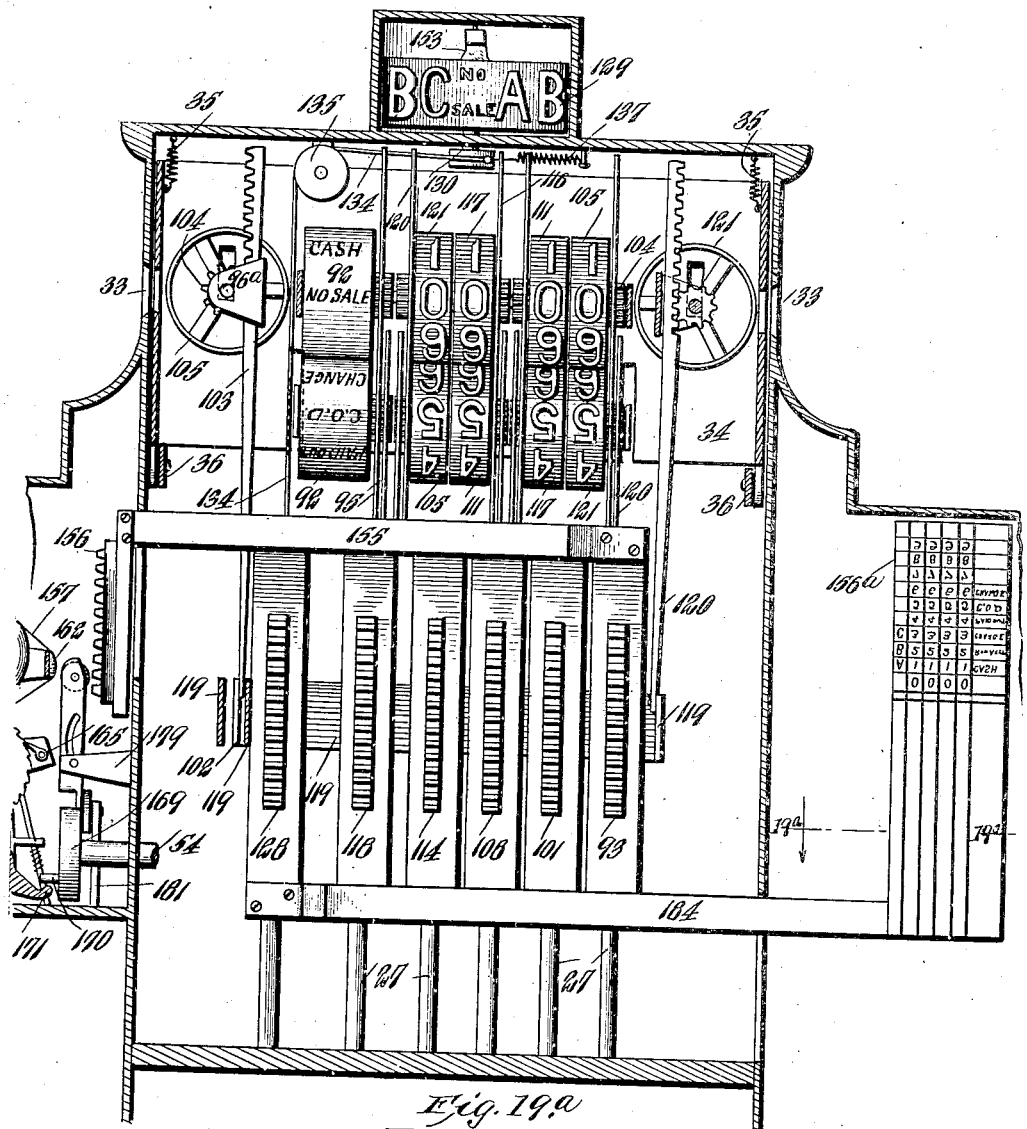
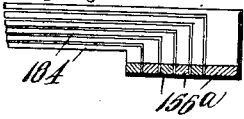

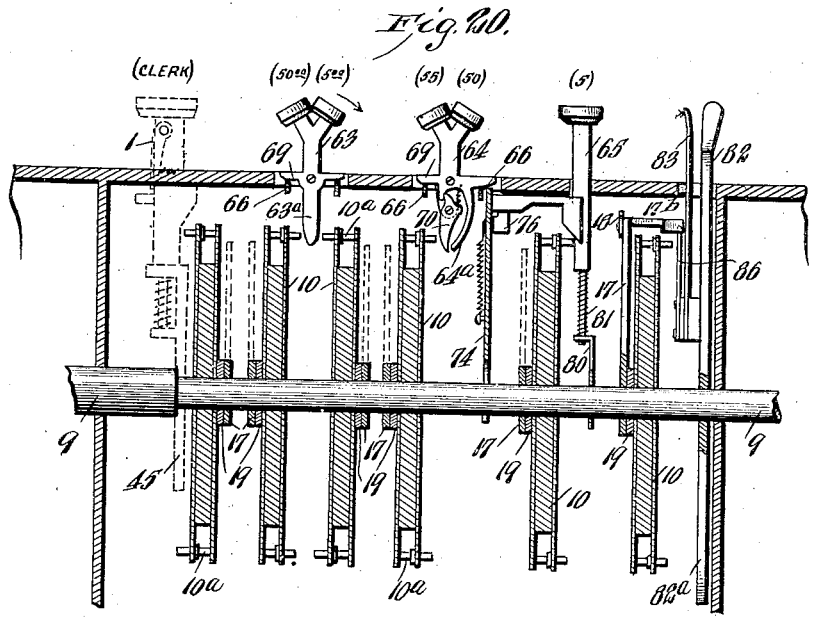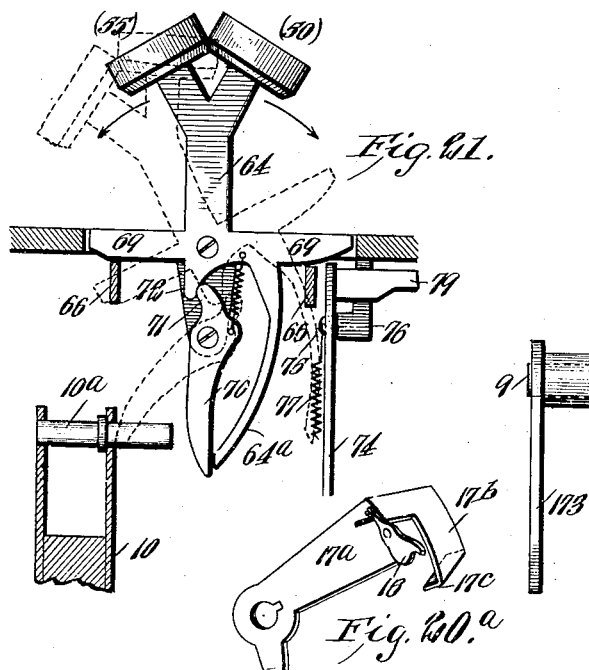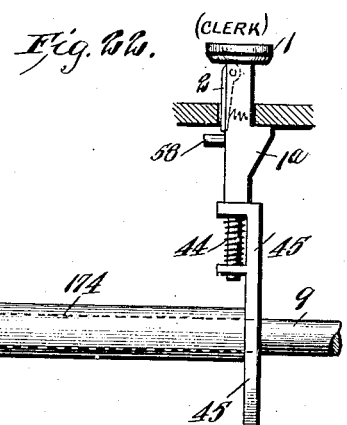

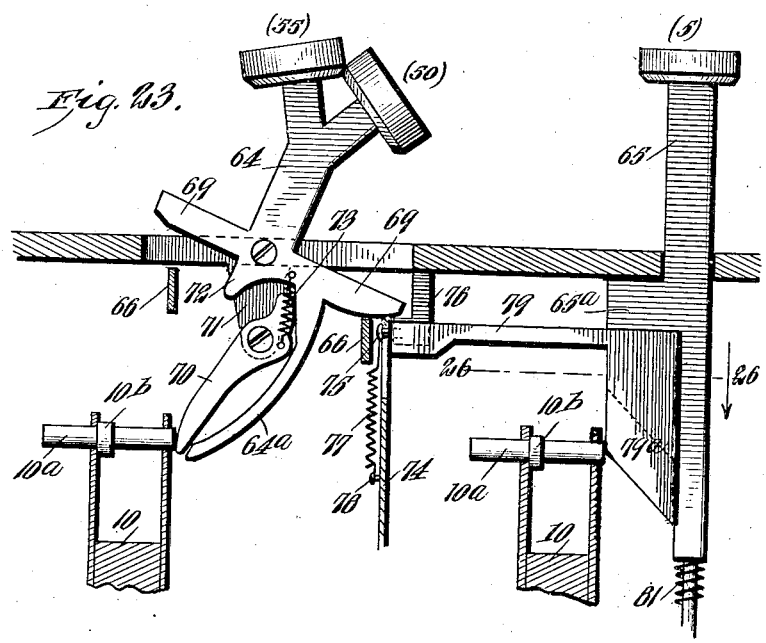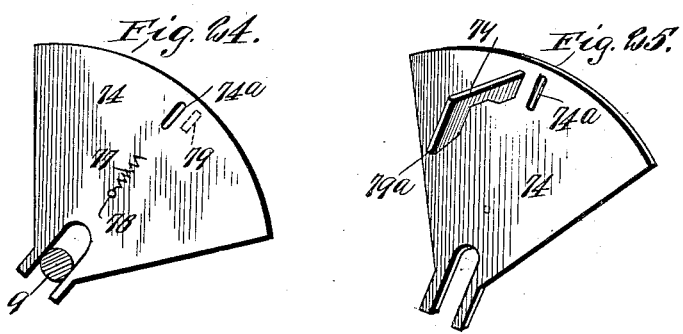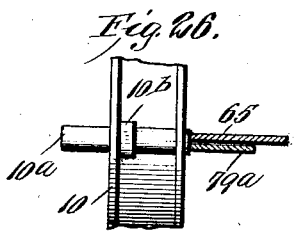

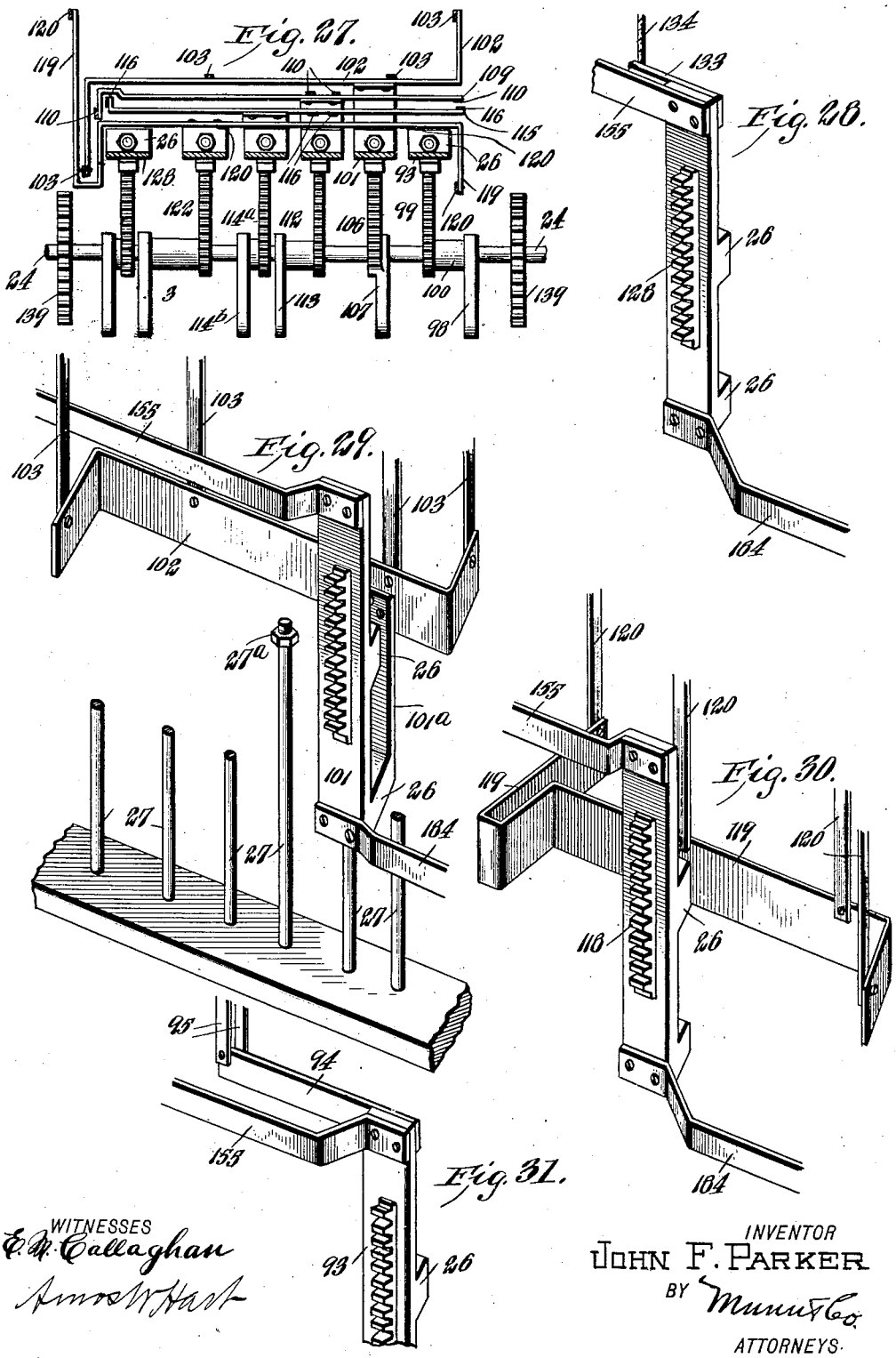

J. F. PARKER.
CASH REGISTER, INDICATOR, AND RECORDER.
APPLICATION FILED AUG. 1, 1908.
913,550.
Patented Feb. 23, 1909
16 SHEETS—SHEET 14.
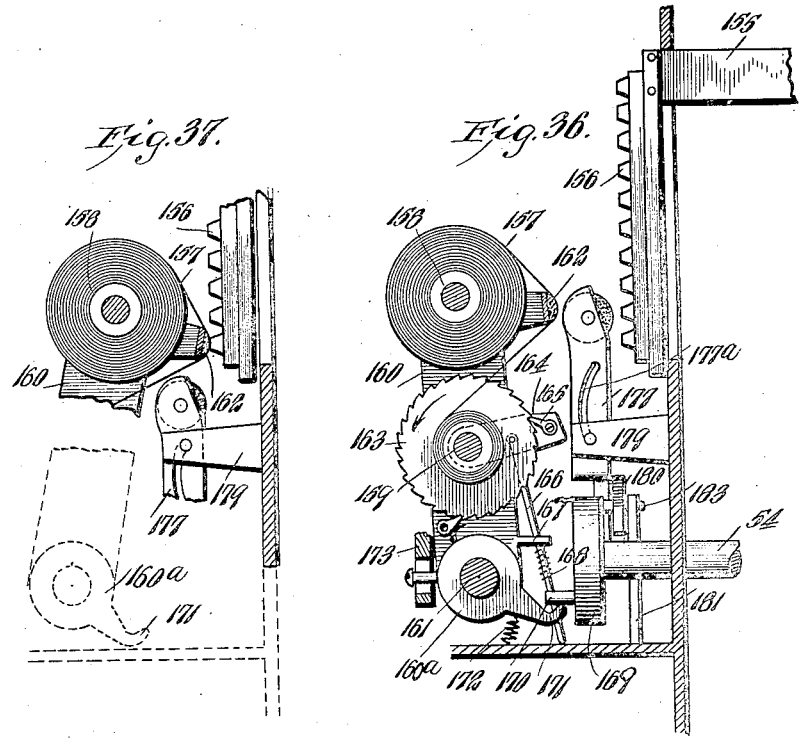
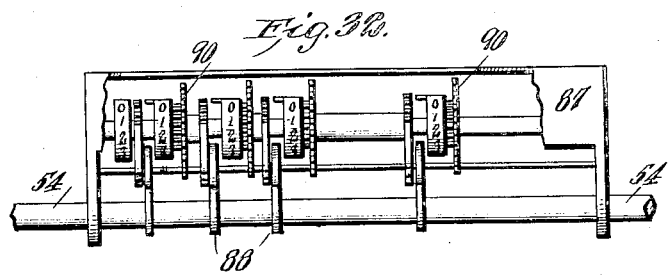
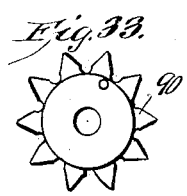
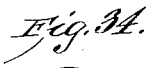
WITNESSES
E. M. Callaghan
Amos W. Hart
INVENTOR
John F. Parker
BY Munn & Co.
ATTORNEYS

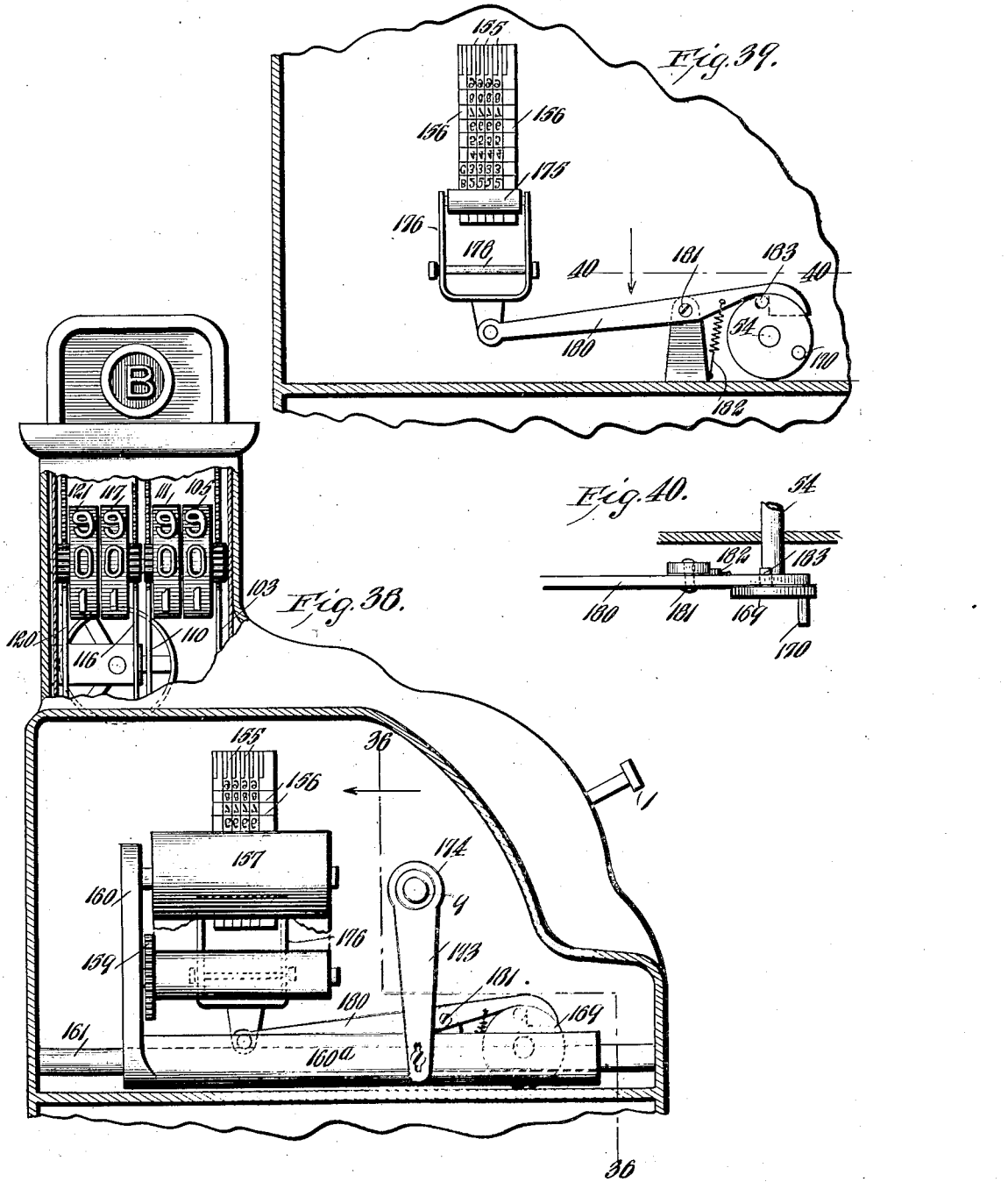

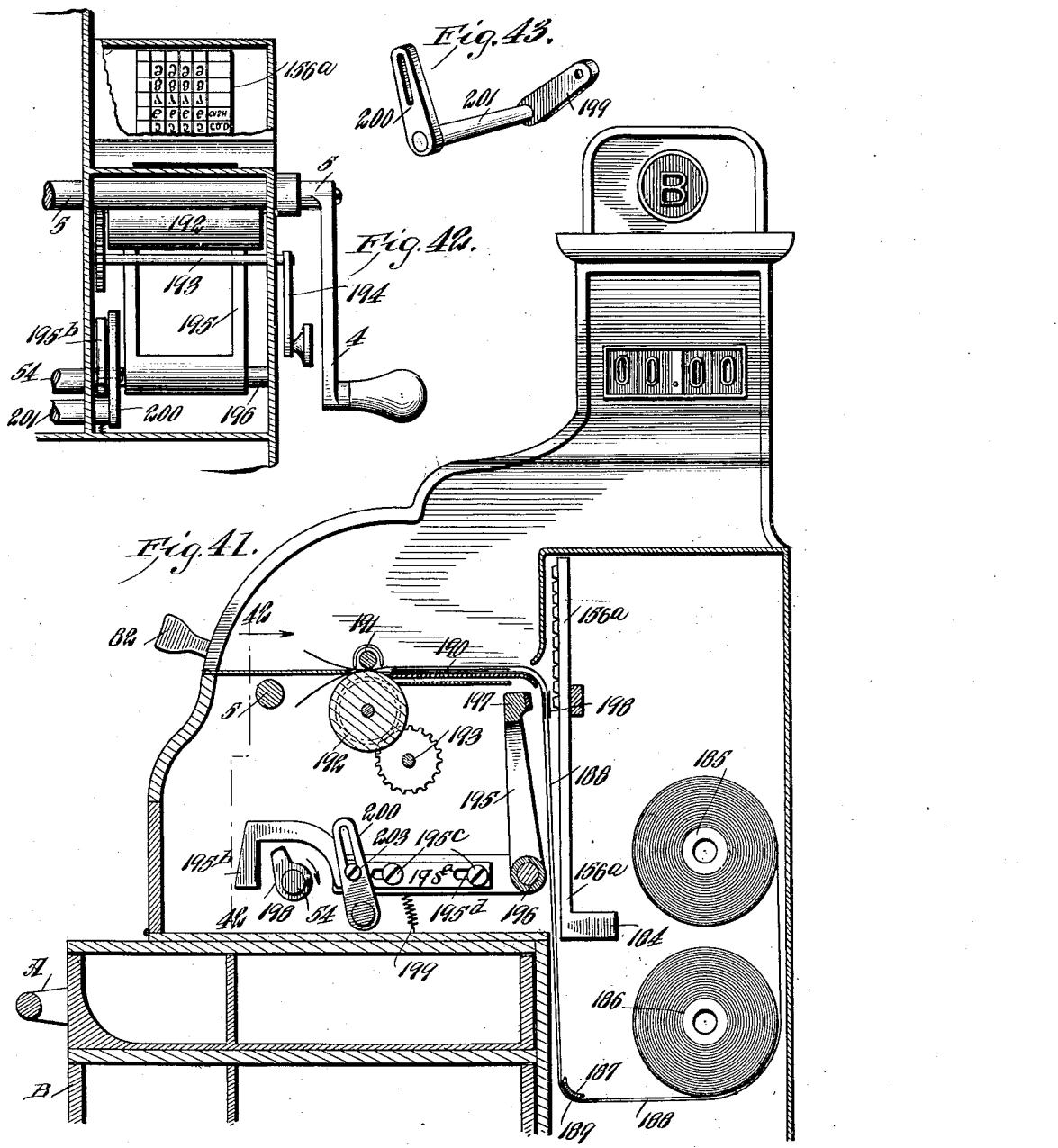

UNITED STATES PATENT OFFICE.

JOHN F. PARKER, OF KANSAS CITY, MISSOURI.

CASH REGISTER, INDICATOR, AND RECORDER.

No. 913,550.

Specification of Letters Patent.

Patented Feb. 23, 1909.

Application filed August 1, 1908. Serial No. 446,400.

*To all whom it may concern:*

Be it known that I, JOHN F. PARKER, a citizen of the United States, residing at Kansas City, in the county of Jackson and State of Missouri, have invented an Improvement in Cash Registers, Indicators, and Recorders, of which the following is a specification.

My invention is an improvement in the class of cash registers having a series of movable keys which constitute the primary means for operating, through the medium of intermediate devices, the registering, indicating, and recording mechanism proper.

The invention is in respect to certain main features, an improvement upon the machine for which I have filed an application for patent, April 16, 1908, Serial No. 427,380. As in the original machine, the amount and character of the different transactions are indicated and exhibited from four sides of the register casing. In the present invention I have devised improved means or mechanism for effecting this result, and also for giving an intermittent or flash light whereby attention is attracted to the indication of the transaction. As in the former machine, I also provide in this for registering the nine different amounts of cents ending with the numeral 5, such as 15, 25, 35, etc., and in registering such amounts it is considered only necessary to operate one key instead of two, as is usual in other cash registers.

I have devised an improved construction and arrangement of keys and mechanism connected therewith for operating the intermittent means or mechanism by which the indicator and register proper are actuated. These keys are arranged to act upon slidable pins carried by rotary disks or wheels and are pivoted so as to oscillate laterally for thus operating the pins.

The arrangement of the department items such as "Cash," "Charge," "Paid out" etc. is such that after setting the lever or key to indicate or register any transaction, the same will be repeated at each subsequent operation of the machine without operating the key or lever again until there is a change in the character of the transaction.

The mechanism controlling the detail recording strip is so constructed that the transactions of the different clerks or departments are printed on a continuous strip in separate columns instead of being mixed up together in one.

While it is essential that such items as "Paid out," "Charge," "C. O. D." etc. be indicated and recorded yet they chould not be added to the cash receipts, so in order to take care of such transactions as a matter of record an autographic sales slip and strip is provided in addition to the detail strip and the arrangement of the department setting lever or key is such that when it is set to indicate such items it throws out of operation the registering or adding mechanism and at the same time puts into operation the printing mechanism for recording the transaction on the autographic sales slip and strip, as the machine is operated it prints the amount and character of such transaction and the salesman pencils the name of the customer and other data on the slip which issues from the register is then severed from the roll and given to the customer while a duplicate is retained within the machine. In this manner and arrangement the detail strip serves as a check on the autographic strip and the autographic feature takes the place of the ordinary day book or journal.

The details of construction, arrangement, and operation of the machine are as hereinafter described and illustrated in the accompanying drawings, in which—

Figure 1 is a perspective view of the machine; Fig. 2 a front elevation of the same. Fig. 3 is a front elevation of the machine with the front of the casing removed to show interior construction. Fig. 4 is a vertical section on the line 4—4 of Fig. 2. Fig. 5 is a perspective view of the movable blind or shutter. Fig. 6 is a vertical section on the line 6—6 of Fig. 2. Fig. 7 is a perspective view of the so-called department key or lever for setting a portion of the mechanism. Fig. 8 is a perspective view of an auxiliary means for setting the indicating mechanism. Fig. 9 is a vertical section on the line 9—9 of Fig. 2. Fig. 10 is a perspective view of devices for locking the registering mechanism when out of action. Fig. 11 is a vertical section on the line 11—11 of Fig. 2. Fig. 11$^a$ is a detail view of two locking dogs in engagement. Fig. 12 is a perspective view of devices for restoring the pins of the rotatable disks to normal position. Fig. 13 is a vertical section on the line 13—13 of Fig. 2. Fig. 14 is a face view of the pin carrying disk with setting mechanism in a different position from that indicated in Fig. 13. Fig. 15 is a vertical section on the line 15—15 of Fig. 2. Fig. 16 is a detail section illustrating the operation of the initial key and connected devices. Fig. 17 is a vertical section on the line 17—17 of Fig. 15, showing means for locking and releasing the tills or money-drawers. Fig. 18 is a horizontal section on the line 18—18 of Fig. 15. Fig. 19 is a vertical section on the line 19—19 of Fig. 11. Fig. 19ª is a horizontal section on the line 19ª—19ª of Fig. 19. Fig. 20 is a section indicated in part by line 20—20 of Fig. 11, showing the arrangement of the different keys of the machine in connection with the pin-carrying disks. Fig. 20ª is a perspective view of the lever that coöperates with the department key. Fig. 21 is a sectional view including a face view of an oscillating cents key in normal position and in connection with other co-acting mechanism. Fig. 22 is a face view of a clerk's initial key with connecting mechanism. Fig. 23 is a sectional view showing a depressible key and an oscillating cents key in a position to actuate simultaneously two pins indicating both tens and units of cents. Fig. 24 is a face view of the movable sector-shaped device upon which an oscillating key of the tens-of-cents bank acts to project a pin indicating five cents. Fig. 25 is a perspective view of the reverse side of such device. Fig. 26 is a cross section on the line 26—26 of Fig. 23. Fig. 27 is a horizontal section on the line 27—27 of Fig. 11. Fig. 28 is a perspective view of a rack forming part of the means for operatively connecting an initial key with an initial indicator. Fig. 29 is a perspective view of the rack and connected parts operating the four indicators for units-of-cents. Fig. 30 is a perspective view of the rack and connected parts for operating the indicator for tens-of-dollars. Fig. 31 is a perspective view of a top portion of a rack and connected parts for indicating various transactions, viz. "Cash" "Paid-out," "Charge," etc. Figs. 32, 33, 34, 35, are views representing the registering mechanism proper. Fig. 36 is a vertical section on the line 36—36 of Fig. 38. Fig. 37 is a sectional view illustrating the operation of a portion of the detail printing mechanism (shown in Fig. 36.) Fig. 38 is a vertical section on the line 38—38 of Fig. 2. Fig. 39 is a sectional view showing part of the detail printing mechanism illustrated in Fig. 38. Fig. 40 is a horizontal section on the line 40—40 of Fig. 39. Fig. 41 is a section on the line 41—41 of Fig. 2, illustrating in part the autographic register. Fig. 42 is a vertical section on the line 42—42 of Fig. 41. Fig. 43 is a perspective view of a portion of certain mechanism more fully shown in Fig. 41.

The casing of the machine has the usual rounded front and rectangular base, in which latter are located the tills or money-drawers marked A, B, C, or with other letters corresponding to the salesman's keys. The projecting end portions of the casing (see Fig. 2) inclose two different sets of printing mechanism, as will be hereinafter described. In an opening through the front of the casing, at the left, is arranged a clerk's initial key 1, the same being provided with a spring catch 2 (see Fig. 22) the same being adapted to engage notches 3—see Fig. 2—arranged opposite the letters A, B, C. This key 1 is operatively connected with the tills A, B, C, and other mechanism, by means which will be presently described.

At the right-hand end of the casing, see Figs. 1, 2, 3 and 42—a crank 4 is attached to a short shaft 5 on whose inner end is mounted fast a small gear 6, shown in Figs. 3 and 4. Such gear meshes with two larger gears 7 and 8 which are mounted respectively on stub shafts 7ª and 8ª. The function of the gear 7 is to rock or impart oscillation to a shaft 9 upon which, as shown in Figs. 3 and 20, is mounted a series of double disks or pin-carrying wheels 10, substantially such as employed in my former invention. The shaft 9 is journaled in the vertical partitions forming the ends of the body of the casing and intervening the body and end compartments in which the printing mechanisms are located. The pin-carrying disks 10 are suitably spaced apart, and are six in number. The pins 10ª of the several disks are arranged adjacent to the periphery of the same and adapted to slide so that they may be projected from the disks as required. Between the disks of each pair, the pins 10ª are provided with collars which limit their movement in both projection and retraction. For projecting the pins, I employ different series of keys whose operation will be presently described. It will be understood, since the keys are arranged upon the arc of a circle, as indicated in Figs. 1 and 11, those bearing the highest numbers being at the top and those bearing the lowest being at the bottom, they will act upon the pins of the disks corresponding to their location, and thus the distance of a pin, on the periphery of a pin-carrying wheel, from a certain point, indicates its numerical value. A pivoted spring dog 11 mounted on the horizontal shaft 60—see especially Figs. 3, 13 and 14—serves to lock each pin-carrying wheel 10 so as to prevent backward rotation, while allowing them to be rotated toward the front as indicated by the arrow in Fig. 13. When through the operation of any key or keys a pin 10ª has been projected from the wheels 10 and it is desired to indicate and register data corresponding to the keys operated and pins projected, the crank shaft 5 is rotated twice, and the gear 6 thereon being half the diameter of the gear 7 with which it meshes, the latter will be revolved but once. It is connected by a pitman 12 with the crank 13 on the rock shaft 9—see Fig. 4. This pitman is provided with a longitudinal slot 15 in which are arranged a slidable block 14 and a spiral spring 16, the arrangement being such that the spring holds the block normally at the outer end of the slot. The parts are shown in the normal position in Fig. 4, but, upon rotating the crank shaft 5 twice, the rotation of the gear 7 in the direction indicated by the arrow will obviously rock the shaft 9 by drawing the lower end of the crank 13 toward the shaft 7$^a$, and returning it, which will have the effect of operating certain devices adapted to engage a projected pin of the pin-wheels 10 and rotate the latter a certain distance. Backward movement of the crank handle and associated mechanism is prevented by the dog 8$^b$ engaging the gear 8.

Fast on the shaft 9 and parallel to each pin-carrying wheel 10, is mounted a lever 17—see Figs. 11, 13 and 14—the same being provided at its outer end with a pivoted spring dog 18 which is adapted to engage any pin projecting from the adjacent disk. Loose on the shaft 9 is a sector-shaped gear 19, one being arranged between each pin wheel 10 and the aforesaid lever 17. To a projecting arm of the same is pivoted a combined spring dog and hook 20. The free end or nose of the dog is adapted to engage a projecting pin of the adjacent disk, and its hook 20$^a$ is adapted to receive a pin 21 projecting from an arm 22 of the lever 17. The toothed sectors 19 mesh with corresponding sectors which are mounted loose on a shaft 24, and each rigidly connected with a similar gear see Fig. 27 that meshes with one of a series of sliding vertical racks. These racks form part of a bar having lugs 26 that receive a vertical guide-rod 27 upon which they are adapted to slide. While there are six racks as shown in Figs. 19 and 27 the front or face of them being similar yet the back and the connected parts all differ somewhat, as more fully shown in Figs. 27 to 31. The function of these racks is to operate the indicating wheels, with which they are connected by horizontal bars and vertical extension racks as will be hereinafter described in detail. If it be supposed that a pin 10$^a$ has been projected from one or more of the pin wheels 10, the crank shaft 5 being rotated twice, its gear 6 will rotate the gear 7 once, and in so doing, the crank 13 of shaft 9 will be rocked and the dog-carrying lever 17 will thus be carried over to the right, Fig. 14, then back to the original position Fig. 13, it is apparent that the nose of the dog 18 of the lever 17 will ride under any projected pin, and springing outward again will engage such pin on its return movement. When the gear 7 has made about three fourths of a revolution, traction on the crank 13 effected by the pitman 12 will cease since the dog 18 then strikes the pin 11$^a$ of the fixed dog 11—see Fig. 11$^a$. There being six dogs 11 their combined resistance must be overcome in order to move the shaft 9 further. This resistance holds the crank 13 in position shown in Fig. 4 while the gear 7 completes the last fourth of its rotation during which the spring 16 yields sufficiently to allow the wrist-pin 14$^a$ to pass, and during this last quarter of the revolution of gear 7, registering and printing mechanism will be operated which is hereinafter described. The hook dog 20 being normally engaged with a projected pin as shown in Figs. 11 and 13, it is apparent the rotation of the pin-wheel 10 will rotate the sector gear 19 and carry it around to a different position say to that indicated by dotted lines in Fig. 14, in which the case wheel has been moved the distance of nine pins, and the corresponding indicating and registering mechanism adjusted accordingly. This partial rotation of the pin wheel and sector 19 will in turn effect the rotation of the sector gears meshing with it, and thus a sliding rack will be brought down thereby operating the indicating wheels so that they will exhibit through the slots 33 of the casing, characters corresponding to the key which has been operated and to the distance which the pinwheel has been rotated. Thus, when a pinwheel is rotated as described, by engagement of lever 17 with a projected pin, the engagement of dog 20 with a pin will cause the sector gear 19 to be rotated the same distance as the pin wheel, and in turn effect the rotation of the indicating wheels as described. When the lever 17 is left at its normal position as indicated in Figs. 11 and 13, the projecting pin engaged by the fixed rod 11, indicates the normal or starting position of the pin wheel for another or subsequent transaction. The sector gear 19 is brought back from any position to which it may be carried—say that shown by dotted lines Fig. 14, whenever the lever 17 is again moved to the right, since the pin 21 of its arm 22 will then engage the hook 20$^a$ of dog 20 and thus carry the sector gear 19 with it back to the position indicated by full lines in Fig. 14, and consequently the sliding rack is moved upward and the indicating wheels are rotated backward to 0. The hook dog 20 will remain engaged with the pin 21, as shown by full lines, Fig. 14, until the lever 17 shall be again brought back to the position indicated by full lines Figs. 11 and 13, in which operation the pin 21 is released from the hook 20$^a$ and consequently the nose of the dog 20 reëngages the projected pin which is held by the fixed dog 11. In other words, the dog 20 is held out of engagement with a pin of the pin-wheel, as in Fig. 14, while being retracted along with lever 17, but the instant of its release from the pin 21 it engages a pin of the wheel as shown in Fig. 13, and is thus again in such position that it forces the sector gear 19 around as before whenever the pin wheel is again rotated.

While the extreme limit of movement of the pin-carrying disk at any one operation of the machine is equal to the distance of nine of the pins $10^a$, yet the levers 17 are rocked backward and forward a distance equal to ten of said pins, this extra movement being necessary to allow the disengagement of the pin 21 of the arm 22, from the hook $20^a$, thereby returning the dog 20 to the position shown in Fig. 13 and in engagement with the projected pin held by the fixed dog 11 which occurs before the dog 18 can come in contact with any projected pin. The dog 20 is normally held in engagement with the projected pin held by dog 11 by means of spring $20^b$ and stop pin $20^c$—see Fig. 14. The hook portion $20^a$ of dog 20 is so formed that when the pin 21 engages it the dog is drawn inward so it may pass the projected pin as it is carried back by the arm 22 while on the return movement of the arm 22 its pin 21 in disengaging from the hook forces the dog 20 outward and in engagement with the projected pin again.

The box-like blind or shutter 34—see Figs. 3, 4, 5 and 9—is arranged in the upper narrow portion of the casing and is adjustable vertically as required to conceal the indicating wheels and obscure or close the slots 33 of the casing until said wheels shall have been rotated to the position required to expose a transaction. As shown the shutter has slots that when the same is properly adjusted will coincide with the slots of the casing and it is also provided with other slots to receive transverse shafts and supports for indicating wheels. Springs 35 are attached to the ends of the shutter and to the dome of the casing for the purpose of steadying the shutter and preventing undue friction with the casing while being adjusted. The shutter is pivotally connected at its lower ends with crank arms 36 which, as shown in Fig. 3, are keyed near the ends of a horizontal shaft 37. The right hand end of said shaft is provided with a crank arm 38—see Figs. 3 and 4—and the same is connected by a pitman or rod 39 with a cam formed on the gear 8—see Fig. 4. As indicated in Fig. 3 the said gear is made of sufficient thickness to provide for a cam groove therein and the pitman 39 is provided with a pin 40 which runs in such groove, the adjacent end of the pitman being forked and supported slidably on the stub shaft $8^a$. It is apparent that since the cam-groove gear 8 is rotated once in every operation of the machine, the shutter 34 will be reciprocated once during that time and will thus alternately conceal and expose the characters on the indicating wheels. Thus, through the double rotation of the crank shaft 5 as before described, and the gear 6 which meshes with gear 8, the shutter will be operated simultaneously with the rotation of the pin-carrying wheels through the medium of the crank 13, shaft 9, the pitman 12, and the gear 7 to which it is connected. It will be understood that the pin-carrying wheels or double disks 10 are rotated always in one direction, but intermittently. Any pins that may be projected from such wheels or disks are retracted or pushed back to their normal position by means of devices illustrated in Figs. 11 and 12. These devices are in the nature of wipers, formed by inclined flanges 41 and and 42 fixed on a bar 43, adjacent to lower edge of each pin-carrying wheel, so as to act on the pins as they pass and thus force them back to normal position.

As has been before indicated, the clerk's initial key 1, see Figs. 15, 16 and 22, has two movements; that is to say, it is adapted to be adjusted vertically to indicate the initial of a clerk, and it then must be depressed or pushed in against the tension of a spring 44 in order that the machine may be operated. It is represented in the drawing as set in the middle position, that is to say for the clerk whose initial is B, and it is correspondingly keyed with the drawer B in such manner that it alone can and will be opened through the subsequent operation of the machine.

As shown in Fig. 15, the key proper is adapted to slide in lugs formed on a lever 45 mounted rotatably on the shaft 9 and having a lateral extension to which a bent bar or rod 46 is pivotally attached. As shown this rod is arranged to slide vertically in bracket guides 47 and a slot $46^b$ is formed in its upper end to allow due play on the pivot for this purpose. As indicated in Fig. 17, the rod or bar 46 has three slots 48, 49, 50, corresponding to the number of money-drawers. Each drawer is provided at its rear with two spring catches 51, which, as will be understood by reference to Figs. 17 and 18, are adapted to engage the two parallel vertical bars 46, $46^a$. When the clerk's key 1 is adjusted in the middle position as shown, the rod or bar 46 is set in such position that it remains engaged only with the catches of the upper and lower drawers A and C, while its slot 49 is opposite one of the catches 51 of the middle drawer B. Since, however, the opposite catch is still engaged with the bar $46^a$, the drawer cannot be opened until the crank shall have been operated to the effect requiring vertical adjustment of the said bar $46^a$ as will now be described. A lever 52—see Fig. 15—is pivoted so that it is practically in a horizontal position, and its rear end engages the bar $46^a$ through an opening in its upper end. The front end of said lever is adjacent to a disk 53 mounted on a shaft 54 and provided with a pin 55, which, in the rotation of the shaft, comes in contact with the adjacent end of the lever 52 and depresses it, thereby raising the notched bar 46ª, as shown by dotted lines Fig. 17, so that the catches 51 attached to the middle drawer B will both be freed and the drawer opened. In other words, the middle notch 49ª of bar 46ª will thus be brought directly opposite the notch or slot 49 of the opposite bar 46, without, however, disengaging the other two drawers A and C. The drawers are ejected automatically by means of the spring 47ª, which is attached to the casing and the extensions 47ᵇ of the drawers. The aforesaid shaft 54 extends horizontally along the front part of the machine and through the partitions that separate the large middle compartment from the end compartments—see especially Fig. 3—where it will be seen that the aforesaid disk 53 is located near the left end. At the right, and on the outer side of the partition, a gear 56 is keyed on the shaft 54 and engages a corresponding gear 57 which is mounted on the same stub shaft with and is attached to the gear 7; see Fig. 4, where the gear 57 is indicated by dotted lines. It is apparent that when the crank shaft is rotated, the train of gears 6, 7, 56, will effect rotation of the shaft 54 together with the disk 53, as already described, but the disk and therefore the shaft are normally locked and prevented from rotation until released by pushing in the clerk's key 1 as will now be explained. As shown in Fig. 15, the said key is provided with a lateral pin 58 which is adapted to engage the upper arm of the lever 59 pivoted on the horizontal shaft 60 and whose lower end or foot 59ª engages a shoulder or notched portion 53ª of disk 53. In Fig. 15 full lines show the disk thus engaged and locked by the lever 59 and the dotted lines—see also Fig. 16—show the lever in the position to which it is forced when the key 1 is depressed, which depression causes projection of pin 10ª of the adjacent pin wheel. There is pivoted loosely to the lower end of lever 59, a dog 61, which is adapted to swing vertically, and when the lever is operated by the key 1, as shown in Fig. 16, the nose of such dog falls down into engagement with the notched portion of the disk 53, so that the lever is held in the position indicated in Fig. 16, but leaves the disk 53 free to rotate in the direction indicated by the arrow. The first movement of the disk 53 will throw up the dog 61 thus allowing the lever 59 to partly retract or until its foot portion 59ª contacts with the periphery of said disk and rides over it until it again moves into the notched portion 53ª thus holding and locking the entire mechanism of the machine. It will be understood that the disk 53 makes one revolution at each operation of the machine. A spring 59ᵇ is attached to the upper arm of the lever and to the front casing and automatically throws the lever 59 back into engagement with the disk 53. A spiral spring 52ª is attached to the rear arm of the lever 52 and thus the latter serves to return the bar 46ª down to its normal position after being raised. To supplement and insure this action of the spring, I provide a small lever 62 which is pivoted directly under the free end of the lever 52 and is depressed by the pin 55 when the disk rotates, so that it presses upward against the overlying end of the longer lever 52.

It will be seen that by the mechanism which has just been described, a money-drawer is released as to one catch only when the salesman's key 1 is adjusted in one of the notches 3 and that it is released as to the opposite catch when the crank shaft 5 is rotated.

I will now describe the construction and operation, of the cash or amount keys, which act on the slidable pins 10ª of the rotatable wheels 10.

As will be seen in Figs. 2 and 20, the two adjacent banks of keys used for dollars and tens of cents are pivoted and adapted to oscillate laterally, and are double-headed, while the key for units of cents is depressible or adapted to slide in the casing, and has a single head. The keys 63 of the first or dollar row, bear numerals on their right hand heads indicating amounts from one dollar to nine inclusive, and those on the left indicate tens of dollars, $10, to $90, inclusive. In the cents row the heads of keys 64 on the right bear amounts from 10 cents to 90 cents inclusive and on the left the numbers are multiples of five but all terminate with the numeral 5; thus they bear the numerals 15, 25, 35, 45, etc. The depressible keys 65, which are for units of cents, bear on their heads, numerals from 1 to 9 inclusive. The keys 63—see Fig. 20—have a shank 63ª that extends inward and lies between, and normally equidistant from, two adjacent pin-carrying wheels. It will be apparent that by pushing the head of a key 63 in either direction it will act upon a pin 10ª of a wheel; thus, if the key whose head is inscribed with the numerals 50 and 5, indicating dollars of those amounts, be pushed to the right as indicated by arrow in Fig. 20, it will project the pin of the wheel which is on the left of the shank 63ª and thus such pin would indicate that the fifty dollar key had been acted upon. The pivoted keys 63, 64, are held in normal radial position by means of spring supports which are furnished by two curved parallel bars 66, as shown in Fig. 13, the same being pivoted on the same shaft 60 as the pin-wheel dogs 11. The bars 66 are there shown as lying underneath and directly in contact with the casing their free ends being supported by a spiral spring 68. The pivoted and oscillating keys 63 and 64 are provided with lateral wings or lugs 69—see Figs. 20, 21 and 23—which rest on the spring-supported bars 66. It will be apparent that if any key 63 or 64 be pushed in one direction or the other, laterally, as indicated in Fig. 23, the spring-support 66 which is on the opposite side will be depressed, but that the spring bar on that side will force the key back to its normal position as soon as pressure is released. The keys 64, indicating tens of cents, have a different shank 64ª from the keys 63; that is to say, the shank is in the nature of a curved prong and is not in line with the body of the key, but is eccentric to its pivot and curved from right to left. Within the curve there is arranged a pivoted device 70—see especially Fig. 23—the same being in the nature of a lever and pivoted to a lug 71 projecting inward from the casing. The longer and lower arm of this lever 70 is adapted for contact with the pins of the wheel 10 on the left and the shorter arm is adapted for engagement with a lug 72 formed on the key 64 just below its pivot. A spiral spring 73 connects the key 64 with the lever 70 and normally holds its shorter arm in engagement with the lug 72, as shown in Figs. 20 and 21. In other words, the spring holds the lever 70 normally out of contact and engagement with the pins of the adjacent pin-wheel on the left. When, however, a key 64 is pushed over to the right as shown in Fig. 23, the curved prong or shank 64ª forces the lower end of the lever 70 into contact with a pin 10ª and projects it as indicated. On the other hand, if the key 64 be pushed to the left, as shown in dotted lines Fig. 21, the lug 72, acting on the shorter arm of the lever 70, will throw the lower end of the same into engagement with the same pin of the adjacent disk. Thus the key 64 serves to project the same pin in the adjacent left hand wheel, whether it be pushed in one direction or the other, or in other words whether it be required to register amounts which terminate with the numeral 5 or amounts which are multiples of 10. By this construction, arrangement, and combination of parts, I adapt the left side head of each of the keys 64 of the tens of cents bank to perform a double function, for which two rows of keys have heretofore been required. This will further appear from the following description of other connected or coöperating parts.

As shown in Figs. 20, 21, 23, 24 and 25, a sector or fan-shaped plate 74 is arranged within the casing alongside the curved prongs 64ª of the keys 64, it being radial to the shaft 9 with which it has sliding engagement. At the middle of its outer portion it is provided with a radial slot 74ª (see Figs. 24 and 25) to receive a guide-screw 75 which secures it slidably to a bracket 76 projecting inward from the casing; see Fig. 23. A spiral spring 77 connects said screw 75 with a pin 78 on the middle portion of the sector. Thus the spring holds the latter normally projected outward radially so that the right hand lugs or wings 69 of the keys 64 are in contact with, or close to, its curved edge. Hence when a key 64 is swung to the right, as shown in Fig. 23, the sector 74 will be pressed inward radially, or toward the shaft 9, and in such manner it carries with it a device 79, which is in the nature of a cam or wiper, the same being formed of a horizontal bar having an end portion 79ª which projects inward therefrom or toward the shaft 9, and whose edge is beveled, as shown in Figs. 20 and 23. It will now be seen that when the key 64 is pressed to the right as in Fig. 23, the cam portion 79ª is forced inward along with the sector 74 to which it is connected, and the cam then acts on a pin 10ª in such manner as to project it. When the key is released from pressure and resumes its normal radial position, the sector 74 is retracted to its normal position and the cam 79ª is consequently removed from contact with the pin. The pin with which it thus coacts is the fifth, or the pin opposite the five cent key in the units bank. Thus when a key 64 is swung to the right, two operations result, or in other words, two pins are simultaneously projected from adjacent pin wheels, since the small lever 70 is then thrown into contact with the pin of the wheel at the left, and the cam 79ª is carried into contact with and projects the pin of the wheel on the right. The pin on the left stands for 10, or some multiple of 10, and the pin on the right for five. Consequently, suppose the particular key 64 which is swung to the right, see Fig. 23, bears on its left head the numeral 55. The pin projected on the left will correspond to 50 cents and the one projected on the right by cam 79ª, being the 5th in the units bank or five cents, an indication and registration of 55 cents will be obtained by such single movement of one key, I therefore, effect the indication and registration of any multiple of 5, which ends in 5, by a single movement of any key 64. The keys 65, for units of cents, are all depressible, as before stated, and the cam 79ª is arranged alongside and slides in contact with the 5th in the units of cents row, as shown in Figs. 9, 20 and 23. The inner ends of the keys 65 are guided in brackets 80 and provided with springs 81 for holding them projected in normal position. They are also provided with a cam surface 65ª for projecting the adjacent pin 10ª when they are depressed, Fig. 23. On the right of the units-of-cents keys 65, is located a so-called "department" key 82; see Figs. 3, 6, and 20. It is mounted loose on the shaft 9 and its inner end 82ª is broadened and sector-shaped, as shown in Figs. 6 and 7. To the shank of this key, there is attached a plate spring 83 which is adapted to engage notches in a plate 84, which, as shown in Fig. 2, forms one edge of a slot 85 formed in the front of the casing, the said notches being indicated, respectively, by the signs "Cash" "Recd. on acct." "Charge" etc.

The spring is provided with a projection adapted to enter the notches, and yields when the two members 82 and 83 are pressed together by the operator, so that the key or lever 82 may be readily adjusted as required. A short spring 86 is also attached to the shank of the lever 82, as shown in Figs. 20 and 7, and is arranged parallel to the longer spring 83. This spring is adapted to bend laterally so as to bring it into contact with a pin $10^a$, in the adjacent pin wheel, and the means for effecting this, are as follows: Referring to Figs. 20 and $20^a$, it will be seen that the sector-shape lever $17^a$ differs from the other levers 17 before described, in that its upper end is provided with a curved right-angular extension $17^b$ whose extremity $17^c$ projects radially inward and is also inclined on its inner edge so as to form practically a cam. When the lever $17^a$ is carried backward by the rocking of the shaft 9 as before described, the cam portion $17^c$ will come into contact with the short spring 86 of lever 82 and force the same laterally or away from the lever proper and into contact with an adjacent pin $10^a$ whereby the latter will be projected on the opposite side of the pin-wheel. This operation will take place whatever may be the adjustment of the lever 82 with respect to the notches opposite the words "Cash", "Recd. on acct.", etc. On the return or forward movement of the lever $17^a$, through the rocking of shaft 9, the dog 18 attached to it will engage the projected pin $10^a$ and thus rotate the pin-wheel a distance sufficient to indicate a transaction, corresponding to the notch in which the key 82 was adjusted, through means presently described. By this arrangement it is not necessary to adjust or operate the department key again until there is a change in the nature of a transaction, since the machine continues to repeat indication of the last transaction, as the aforesaid lever $17^a$ automatically projects a pin on its backward movement and engages it on its return movement. The department key 82 performs two other functions also, namely, it throws the adding mechanism and one of the printing mechanisms into and out of operation as required. The first-named function will now be described. The adding mechanism is contained in a box-like frame 87—see Figs. 3, 6 and 32—which is mounted to swing on shaft 54 arranged horizontally in the lower front portion of the machine casing. Figs. 3 and 32 to 35 illustrate the adding mechanism, which may be of a well known type and hence requires no detailed description. The shaft 54 has a series of cams 88 adapted to operate the transfer portion of the adding mechanism. The sector end $82^a$ of the department key has a curved or cam slot $82^b$; see Figs. 6 and 7, which receives a pin 89 in the end of the lever arm $87^a$ of frame 87. When said pin is in the portion of slot $87^b$ which is nearer the shaft 54, the frame 87 is supported so that the several star wheels 90 of the adding mechanism are all in mesh with the pin wheels 10, so that upon rotating the latter, the star wheels will be rotated also and the adding mechanism as a whole correspondingly operated. Thus, when the department key 82 is adjusted opposite "Cash" or "Recd. on acct." the adding mechanism is held up in operative engagement with the pin wheels, but when the said key is adjusted opposite any other sign, say "Charge" or "Paid" etc. the adding mechanism is thrown down and away from the pin-wheels and consequently out of action. This latter result is due to the shape of the slot $82^b$ in the sector $82^a$ the larger portion of which is farther from the fulcrum of the key than the shorter portion. Dotted lines Fig. 9 show the position of the star wheels when thrown down or out of action, and in such case in order to prevent a possible accidental rotation of the star wheels and a consequent false movement of connected parts of the adding mechanism, the wheels are made to engage forked or notched supports 91 that are fixed on the base of the casing, see Fig. 10.

The several indications of department transactions, such as "Cash" "Recd. on acct." "Charge" etc., are given by means of rotatable indicating wheels arranged in the upper narrower portion of the casing and are operated, i. e. rotated as required, by means of rack-and-gear mechanism now to be described. As shown in Figs. 9 and 19, there are two wheels 92 inscribed with the words "Cash" "Recd. on acct." etc. and these are arranged near the left end of the casing in different horizontal planes, one over the other, in order to economize space and enable the casing top to be made comparatively narrow. These wheels 92 may be seen through side slots 33 of the casing when the shutter 34 is suitably adjusted with its slots $34^a$ in coincidence with slots 33.

The sliding rack 93, for operating the wheels 92, is shown in perspective in Fig. 31, and in other ways in Figs. 6, 19, and 27, and, as before indicated, in common with all other racks to be employed and presently described, is provided with back lugs 26, having holes for receiving the vertical guide rods 27.

As shown in Fig. 31, a short bar 94 projects horizontally from the top of the rack 93 and two rack bars or rods 95 extend upward therefrom, as indicated in Fig. 13, and engage pinions 96 which are keyed on the same shafts 97 with the indicating wheels 92 just referred to. It is obvious that when the rack 93 is raised and lowered, the wheels 92 will be rotated correspondingly. The required connection between the rack 93 and the sector gears 19 heretofore described, is effected by means of a segment gear 98 and a corresponding gear 99, the two gears being rigidly connected by a sleeve 100, as shown in Fig. 27. The operation of the segmental gear 19 heretofore described, meshing with the segment gears 98 and 99 will serve to expand the vertical movement of the sliding rack 93 as required for effecting the desired indication of "Cash" "Charged" etc. or any other transaction by means of the indicating wheels 92. The racks 95 and other similar racks are held in mesh with the pinions 96 by guides 96$^a$ as shown in Fig. 9.

I will now describe the amount-indicating mechanism, and first the units-of-cents mechanism. The rack 101 which is next to rack 93, see Figs. 19 and 27, is shown in perspective in Fig. 29, and in front view in Fig. 19—see also Fig. 9. This rack is guided vertically on one of the rods 27 and its lower back lug is extended and provided with a vertical arm 101$^a$, to whose upper end is attached the horizontal bar 102, which, as indicated in Figs. 27, 29, is bent in opposite directions at each end. A rack bar 103 is attached to each of such ends and two others to the body of the bar, and they extend into the upper part of the casing and engage pinions 104 which are rigidly connected with four indicating wheels 105 that are inscribed with numbers from 0 to 9 and all represent units of cents and are visible through slots in the four sides of the casing. The upright arm 101$^a$ is spaced from the upper lug 26 of the rack 101—see Figs. 27, 29—in order to accommodate the horizontal bars 109, 115, and 119 which are attached to and extend laterally from other racks.

As indicated in Fig. 27, the rigidly connected segment gears 106 and 107 are operatively connected with the rack 101 and with the sector gear 19 as will be readily understood. The next rack 108 is for tens-of-cents and is shown in horizontal section Fig. 27 and in front view Fig. 19; as shown in Fig. 11 its lower back lug is extended and provided with a vertical arm 108$^a$ and to it is attached a horizontal bar 109, see Fig. 11, which is operatively connected by four small racks 110, with four indicating wheels 111; see Figs. 6, 11, 19 and 38. This rack 108 is operated in the same manner as racks 93 and 101 by means of sector gears 112 and 113. The units-of-dollars rack indicated by 114, is also provided with a vertical arm 114$^a$ to which is attached at the upper end, a horizontal bar 115, and four small rack bars 116 extend therefrom to pinions connected with four indicating wheels 117, see Figs. 6, 11, 19 and 38. It is operated by two rigidly connected sector gears 114$^a$ and 114$^b$ in the same manner as other racks Fig. 13. Thus the three sliding racks 101, 108 and 114 just described being provided with vertical arms respectively 101$^a$, 108$^a$ and 114$^a$ to which is attached at their upper ends, the horizontal bars respectively 102, 109 and 115 each bar having four vertical racks connecting with four indicating wheels all representing the same numeral value, are the means for these parts, in combination with other mechanism, to exhibit a transaction from the four sides of the register. The next rack 118, is for tens-of-dollars, and is shown in perspective in Fig. 30, in cross section in Fig. 27, and front view Fig. 19. To it is attached a horizontal bar 119, which is bent at a right angle at one end and at two right angles at the opposite end. It is connected by four small rack bars 120 with the pinions of four indicating wheels 121; see Figs. 6, 9, 19 and 38. This horizontal bar 119 is attached to the upper lug 26 of the rack 118 just described. It is operated by two rigidly connected sector gears 122 and 123 in the same manner as other racks which have already been described. The last rack bar of the series, No. 128, is connected with the initial key 1, and serves to operate a horizontal wheel 129 arranged on a vertical axis 130 in the dome of the casing. The rack 128—see perspective view Fig. 28 and section Fig. 27—is operated by segment gears 131 and 132, rigidly connected like others already described, and like them pivoted on the shaft 24. A short bar 133 extends horizontally from the upper end of rack 128, and a wire or rope 134—see Figs. 15 and 19—extends therefrom over an idler 135, to a pulley 136 on the axis 130 of the indicating wheel 129. A retracting spring 137 is attached to said pulley 136. It will be seen that when the initial rack 128 is operated in the course of the operation of the machine by the crank shaft 5, as already described, the wheel 129 will be rotated so as to bring opposite the slots in the four sides of the dome a letter corresponding to the position of the initial key 1. Thus, as B is shown through the slots Fig. 1, it indicates that the clerk's key 1 has been set at B, and that the clerk so indicated is operating the machine. The periphery of the wheel 129 is spaced into four equal parts, or sections, each having the words "No sale" and the letters "A, B, C" therein. Each guide rod 27 heretofore described has threaded on its upper end a nut 27$^a$ which serves to adjust and limit the movement of the sliding rack.

Keyed to shaft 37 are four levers 137$^a$ see Figs. 3, 11 and 13. They are in line with and adapted to engage the free end of the curved bars 66 thus locking the oscillating keys, in the following described manner. The shaft 37 being rocked at each operation of the machine, as heretofore described, will at the first movement of the parts adjust the levers upward, as shown in dotted lines in Figs. 11 and 13, and in engagement with the bars 66 and they will remain in that position until about the last movement of the operation when they will return to normal position leaving the bars 66 and thus the keys free to act again.

In Fig. 8 there is shown in perspective an auxiliary mechanism for carrying up the rack bars 93, 101, &c. and thereby rotating the indicating wheels back to 0. Sector gears 138 are keyed on shaft 9 and mesh with corresponding gears 139 mounted loose on shaft 24. The gears 139 have extended radial arms 139ª whose outer ends are connected by a bar 140. The rocking of the shaft 9 raises the bar 140 into contact with the sector gears, which engage the six racks that operate the indicating wheels and insures the rotation of the latter to perfect alinement of the numbers thereon.

I employ flash lights or signals for giving notice that the machine is being operated and for illuminating the indicating media. The mechanism for effecting this is illustrated chiefly in Fig. 4. As there shown, a sector 141 meshes with the pinion 142 which is mounted on the same shaft with the large gear 143, that in turn meshes with the pinion 144 to whose head are attached blades 145, constituting a fan which serves as a retarder for the operation of the signal lamp, as will now be described. The sector 141 is connected with the crank 13 of the shaft 9, by means of a bar 146 which is provided with a lengthwise slot 147 that receives a pin 148 fixed on the sector. The latter is provided with a radial extension 141ª whose periphery is provided with a toothed electrical contact 149. The latter is adapted to slide on the free end of a pivoted spring contact 150, and conductors 151 are connected with the two contacts and with the lamps in the circuit. The lamps are indicated by numerals 152 and 153, see Figs. 11 and 15, and located in such manner as to illuminate the upper portion and dome of the casing and all the indicating wheels arranged therein. The said wheels are preferably constructed with glass peripheries or of other translucent material; or they may have stencil-cut characters. A spiral spring 154, see Fig. 4, is attached to the toothed sector 141 and serves to retract it, as will be readily understood from the drawing. In the rotation of the gear 7, as has been before described, the crank 13 of pin-wheel shaft 9 is drawn to the left and the sector 141 is moved with it through the pull or traction of the slotted bar 146. In this operation, the two contacts 149 and 150 rapidly make and break the circuit three times, and consequently three flash signals are quickly given by the lamps 152 and 153. In this movement to the left, the toothed sector 141 rotates the pinion 142 on its journal without moving the gear 143; but in the return movement of the sector, caused by the retracting spring 154, the pinion 142 is rotated in the opposite direction, and by engagement with a pawl 154, which is pivoted to the gear 143, the latter is rotated in the direction indicated by the arrow, and, in consequence, the fan 145 is also rotated, and serves to retard the rotation of the gear 143 and thereby the rotation of the sector 141 so that the make-and-break of the lamp circuit is made slowly, and thus three intermittent flashes of the lamps are given at comparatively long intervals. It is apparent that the slot 147 in the bar 146 permits this slow return movement of the sector 141.

The detail printing mechanism located in the left end of the casing is constructed and operates as follows: Each of the six rack bars, see Fig. 19, by which the indicating wheels are operated, is provided with a bar 155 attached at the top and extending to the left and through the partition separating the end compartment from the main compartment—see Figs. 27, 31. In the end compartment, vertical bars 156, bearing numerals and other characters, are rigidly attached to and pendent from the aforesaid bars 155. It is apparent that the bars 156 move up and down with the rack bars.

Referring to Fig. 38 the bar 156 on the left is inscribed with the letters A, B, C, corresponding to the different positions to which the initial key 1 may be adjusted, and the bar on the right will bear the words "Cash" "Recd. on Acct." etc. corresponding to the several adjustments of the department key 82, while four bars that intervene these outer ones bear numbers corresponding to those of the amount-indicating wheels. It is apparent that the adjustment of these bars 156 up and down will correspond not only to the vertical adjustment of the rack bars 93, 101, etc. but also to the position to which the indicating wheels may be rotated. Thus any indication given by said wheels will be practically repeated by the corresponding adjustment of the pendent or vertical bars 156. When the bars 156 have been adjusted vertically corresponding to any transaction indicated by the wheels, the printing is effected by bringing in contact with the bars a paper strip 157, as shown in Fig. 37. The paper strip is wound on a reel 158 and wound off on a drum 159 arranged below it, both being journaled on an arm 160, rigidly connected with a cylinder or elongated sleeve 160ª which is adapted to rotate and slide on a shaft 161 arranged horizontally, and transversely of the printing compartment. Intermediate of the two parts 158 and 159, the paper strip 157 passes over a platen 162 which is adapted for contact with the printing bars 156. A ratchet wheel 163 is fast on the drum 159 and rotated in the direction indicated by arrow, Fig. 36. For intermittently rotating such drum, a lever 164 is pivoted on the drum shaft and provided with a dog 165 which engages the ratchet. A push-rod or pawl 166 is attached to the pawl lever 164, and passing through a guide 167 of the arm 160, rests on the floor of the compartment. A spiral spring 168 is arranged on the rod below the guide 167 and serves to hold the pawl lever 164 retracted. It is apparent that if the arm 160 be swung to the right for printing, as shown in Fig. 37, the ratchet drum will be rotated through the medium of the push pawl 166 and pawl lever 164, and thus the paper strip will be advanced intermittently as required. The means for thus swinging the arm 160 from position shown in Fig. 36 to that shown in Fig. 37, is a disk 169, mounted on the shaft 54, and having an eccentric pin 170 projecting from its left face and adapted to engage the longitudinal flange, or cam, 171 formed on the side of the sleeve or cylinder 160$^a$. The pin disk 169 rotates with shaft 54 and therefore once in the operation of the machine, and the pin 171 is carried into contact with the cam 170 of sleeve 160$^a$ so that the latter is rotated correspondingly and its arm 160 swung to the position shown in Fig. 37, whereby the printing is effected. When the pin of disk 169 passes out of engagement with the cam 171, a spiral spring 172 restores the sleeve 160$^a$ and arm 160 together with the paper strip to the original position shown in Fig. 36.

The strip-carrying means described may be shifted to the right and left, see Fig. 38, for the purpose of allowing the printing on the strip to be made in three separate divisions or columns. This requires that the sleeve or cylinder 160$^a$ shall be shifted longitudinally on the shaft 161 and this is effected through the medium of an arm 173, see Figs. 38 and 22, the same forming a rigid attachment of a sleeve 174, that is adapted to rotate on the pin-wheel shaft 9, and to whose inner end is attached the lever 45, in which the clerk's or initial key 1 is adapted to slide as indicated in Fig. 15. It is apparent that when the clerk's key is adjusted opposite a letter, A, B, or C, the arm 173 will be swung to a corresponding position. In Fig. 38 the said arm is shown in the intermediate position because the clerk's key is set, as shown in Figs. 1, 2, opposite the letter B. In such case, the paper strip carried by the drums necessarily takes the middle position, as indicated in Fig. 38, and consequently, the printing will be effected in the middle of the strip. At the end of the day's transactions, by referring to this paper strip, the transactions indicated by A, B, C, may be seen and read in their consecutive order in the three columns, or printed divisions, of the strip.

I provide an inking attachment for the printing bars 156 which is constructed and operates as follows: An inking roller 175, see Figs. 36, 37, 39, is journaled in a forked frame 176, which is provided with curved slots 177 that receive a short shaft 178 held in a horizontal bracket 179, see Fig. 36. The lower end of the frame 176 is connected with a lever 180 journaled in a bracket 181, and its opposite end being curved, as shown in Fig. 39. A spiral spring 182 is attached to the shorter arm of the lever and serves to balance the inking roller and its support. The disk 169 of shaft 54 is provided on its right hand side with a pin 183 which is adapted for contact with the curved end of the lever 180. It will now be apparent that since the disk 169 is rotated with the shaft 54 once in each operation of the machine, the pin 183 will, in such rotation, come in contact with the curved arm of lever 180 and thus the inking roller will be reciprocated vertically. In such movement, the roller will also be carried laterally and into contact with the printing bars 156, by means of the curved slot 177$^a$ formed in the forked frame 177, see Fig. 36. The curve of the slot is convex to the printing bars 156 and hence when the inking roller is in the upper or lower limit of its movement, it will be thrown away from the printing bars 156; but, in the middle of the movement of the roller the slot causes it to move laterally into contact with the said bars.

I will now describe the autographic printing mechanism located in the right hand end of the casing. To the lower ends of each of the rack-bars 93, 101, etc. there is attached a bar 184, see Figs. 27-31, which extends to the right and passes through the right hand partition separating the main compartment from the autographic printing compartment, in the same manner as described with reference to the detail printing. I employ in this instance also a series of printing bars 156$^a$—see Figs. 19, 19$^a$ and 41—the same being attached to the ends of the said horizontal bars 184, and projecting upward, instead of downward like the first-described printing bars 156.

As will be understood by reference to Fig. 19$^a$, the printing bars 156$^a$ are formed on angular extensions of the bars 184. In the compartment there are arranged two drums 185, 186, one above the other, on which paper strips 187 and 188 are wound, the same passing over a guide 189 and up to and over a horizontal guide or table 190, and thence between two rolls 191 and 192, the latter being the larger, and serving, when rotated, to carry the two strips under the idler 191. Rotation on the roller 192 is effected by gearing it with a crank shaft 193, which, as shown in Figs. 1, 2, 3 and 42, is provided exteriorly of the machine with a crank 194. A right-angular or elbow lever 195 is journaled on a shaft 196, its vertical arm having a pad attached at 197 to constitute a presser or platen adapted to carry the strips 188 against the printing bars 156ª. At this point, two carbon or inking bands 198, are suitably arranged in connection with the paper strips so that what is printed on the inner strip will be duplicated on the other. A spiral spring 199 holds the elbow lever 195 in normal position as shown, that is to say, with the platen out of contact with the paper strips. To the horizontal arm of lever 195 there is attached a slidable extension 195ª, the same being secured by means of screws 195ᶜ passing through slots 195ᵈ, as shown in Fig. 41. The outer end of the extension 195ª is provided with a beak, or nose, 195ᵇ, which, when the said extension is duly adjusted, is adapted for contact with the cam 198 keyed on the rotatable shaft 54. The said extension 195ª is adjusted for such contact, save when the department key 82 is adjusted at the limits of its movements, towit, to indicate "Cash" or "Change", which indications it is not desired to print on the paper strips. The contact of the cam 198 with the beak 195ᵇ will tilt the lever 195 to cause the platen 197 to press the strips against the printing bars 156ª. On the other hand, when the parts are adjusted as shown in Fig. 41, the beak 195ᵇ cannot come into contact with the cam 198 when rotated, and therefore the lever 195 will not be rocked. Whenever the department key 82 is adjusted for any position or indication intermediate of "Cash" and "Change," the beak 195ᵇ is likewise adjusted so that it may come in contact with the cam 198 and thus effect a printing operation. For this purpose, I employ a device illustrated in perspective in Fig. 43, see also Figs. 6 and 41. Crank arms 199 and 200 are rigidly connected by a short shaft 201. A pin is fixed on the outer end of crank 199 and works in a curved slot 202 formed in the outer end of the sector portion of the department key 82, see particularly Figs. 6 and 7. It will be seen that this slot 202 is curved abruptly inward at the ends so that when the said pin is in either end of the slot, the slotted crank 200 will be placed in the position required to hold the beak 195ᵇ of the sliding lever extension 195ª out of the path of the cam 198, since the crank 200 is connected with the said extension by a pin 213. In Fig. 41, the crank arm 200 is shown in the position in which it is held when the department key is adjusted opposite the indication "Cash", but if the department key be adjusted one notch higher, or opposite "Recd. on Acct.", the crank arm 200 will be set vertically and thereby the slidable extension 195ª will be moved to the right so as to bring its beak 195ᵇ into the path of the cam 198 and the latter will raise it in its rotation and thus effect a printing on the strips 188. When the pin of the crank arm 199 is in the other extremity of the curved slot 202, that is to say, when the department key is at the upward limit of its stroke and opposite the indication "Change", the said crank arm will be again placed in such position that the cam 198 can not contact with the beak 195ᵇ. For convenience of designation and to better distinguish the paper strips from each other, the upper one, where they pass over the table 190 is termed a "sales slip", and the under or lower one a "continuous strip". The latter passes down into the casing of the machine and may be conveniently inspected at any time, access to that portion of the casing being had through a hinged door, as shown in Figs. 1, 2 and 41. The autographic record made by a clerk on the upper or "sales slip", together with the printing record thereon, may be torn off and delivered to a customer, as is well understood by those acquainted with this class of machines. Carbon paper or its equivalent is interposed between the two strips as they pass over the table or autographic writing surface 190.

I claim—

1. In a cash register, the combination with indicating mechanism and devices for actuating the same, of keys which are pivoted and oscillate laterally and provided with two heads marked with different numbers, substantially as described.

2. The combination with indicating mechanism, a rotatable pin-wheel and sliding pins arranged therein, of a double-headed key which is pivoted and adapted to oscillate laterally and provided with an eccentric extension or shank, a lever pivoted on the casing and adapted for contact with the key shank and to engage and project a pin substantially as described.

3. In a cash register, the combination with indicating mechanism, a movable pin-carrier and means for operatively connecting them, of a double-headed key pivoted and adapted to oscillate laterally, and provided with a shank extending into the casing, and a movable device arranged intermediately of the key and the pin carrier, and adapted to be acted on by said key for projecting a pin, substantially as described.

4. In a cash register, the combination with an indicating mechanism and a pin carrier, of a pivoted key adapted to oscillate laterally, and to act on the pins of said carrier, a depressible spring-supported device 74 adapted to be depressed by the key, the device being provided with a lateral arm 79 adapted to act on the pins of an adjacent wheel when the key is rocked in that direction, substantially as described.

5. In a cash register, the combination with indicating mechanism and pin carriers operatively connected therewith, of a pivoted key adapted to oscillate laterally, a plate 74 which is depressible radially to the axis of the pin-carrier and arranged for contact with a portion of said key, and provided with a lateral extension having a pendent cam 79ᵃ adapted, when the plate is depressed by rocking the key for sliding contact with a pin in an adjacent carrier, substantially as described.

6. In a cash register, the combination with slidable tills of a rotatable pin-carrier and its shaft, a key which is journaled on said shaft and thus adapted to oscillate in a vertical plane, and provided with a longitudinally slidable depressible part, and till-releasing mechanism interposed between said tills and key and which the key actuates simultaneously with the projection of a pin on the pin-carrier, as shown and described.

7. In a cash register, the combination with means for operating the machine which includes a rotatable shaft having a disk provided with an abutment, a depressible key, a pivoted lever acted on by said key, a dog pivoted to the lower end of the lever and adapted to engage the said abutment for temporarily preventing locking reëngagement of the lever with the disk and to be thrown out of lock when the disk shaft is rotated, as shown and described.

8. In a cash register, the combination with a movable till provided with catches, notched bars with which the catches are adapted to coact for locking and releasing the tills, an adjustable key connected with one of the notched bars, means for operating the machine, and a device which operatively connects such means with the other notched bar, whereby when the key is adjusted and the machine is operated the notched bars are successively raised and the till catches successively released, substantially as described.

9. In a cash register, the combination with sliding tills provided with spring catches, and slidable bars arranged parallel and provided with notches arranged relatively with the catches in such manner as to allow release of one till when the bars are properly adjusted, a movable key connected with one of the notched bars and adapted for adjusting it vertically, a pivoted lever connected with the other notched bar for a similar purpose, means for operating the machine and including a device adapted to act on the said lever for operating the notched bar connected therewith, substantially as described.

10. In a cash register, the combination with printing bars arranged vertically, a swinging frame and a paper strip carried thereon and adapted to be brought into contact with the printing bars, means for operating such frame, and an inking roller which is vertically reciprocable, a frame in which the same is journaled, said frame being provided with curved slots, a transverse shaft passing through said slots and fixed in position, and means for reciprocating the frame, substantially as described.

11. In a cash register, the combination with indicating devices, rotatable pin-carrying wheels and registering mechanism adapted to coact with the latter, of an adjustable setting key or lever having its inner end provided with a cam groove and the frame in which the register mechanism is held having a lever arm provided with a pin adapted to traverse said groove, whereby adjustment of the key throws the registering mechanism into and out of engagement, substantially as described.

12. The combination with rotatable indicating devices, pin-carrying wheels, and registering mechanism including actuating star wheels which engage the pins of the wheels, fixed supports with which the star wheels are adapted to engage when the registering mechanism is thrown out of action, whereby the said mechanism is held in due adjustment during that time, and means for adjusting the mechanism in and out of action, as shown and described.

13. In a cash register, the combination with indicating devices of vertically adjustable rack bars, fixed vertical guides therefor, horizontal bars which are rigidly attached to the rack bars and arranged parallel and having their ends bent at different angles, and smaller supplemental rack bars operatively connecting the horizontal bars and the indicating devices, substantially as described.

14. In a cash register, the combination with indicating devices of vertically adjustable racks which are operatively connected therewith and horizontal bars 184 attached to the lower ends of the rack bars and extending laterally and vertical printing bars attached thereto, printing mechanism proper coacting with said printing bars, and means for operating the rack bars and printing mechanism, substantially as described.

15. In a cash register, the combination with indicating devices of vertical reciprocable rack bars 101, 108, and 114 having vertical arms arranged parallel to their backs and spaced at different distances therefrom, and horizontal bars attached to the upper ends of the said arms, the inner ones lying and adapted to move vertically within the spaces between the arms and bodies of the adjacent racks, and means for operatively connecting the said horizontal bars with the indicating devices, substantially as described.

16. In a cash register, the combination with indicating devices, of adjacent and vertically reciprocable rack bars having vertical arms attached to their lower portions and arranged parallel to, and spaced at different distances from, the backs of the rack bars, horizontal bars attached to the respective arms of said racks and one of them passing between the rack arm and the body of the adjacent rack, devices which operatively connect such horizontal arms with the indicators, fixed vertical guides for the rack bars, and means for reciprocating the latter, substantially as described.

17. In a cash register, the combination with indicating devices, of a series of vertically reciprocable rack bars, the corresponding series of horizontal bars secured to said rack bars and having ends bent at an angle and in different directions, and supplemental rack bars attached to their extremities and thus occupying different positions vertically corresponding to the location of the indicating devices, guides for the rack bars, and means for reciprocating them, substantially as described.

18. In a cash register, the combination with a printing media, a presser for bringing the printing surface into contact therewith, and a rotatable shaft provided with a cam and forming part of the operative mechanism of the machine, of a lever key 82 having its inner end provided with a cam groove 102, and a rocking device comprising a shaft having rigidly connected crank arms, which operatively connects the said key with the slidable attachment, whereby the latter is adjusted with the key for bringing the slidable attachment into, and out of, the path of the cam, whereby the printing is effected or omitted, substantially as described.

19. In a cash register, the combination with indicating means, of pin-carrying wheels and means for operatively connecting them with said means, of a rotatable shaft whereon the pin-wheels are mounted, lever arms 17 keyed on said shaft, dogs pivoted to the other ends of said arms and adapted to engage the pins projected from the wheels, means for rotating the said shaft, and an automatic locking device 11 adapted to engage a projected pin for preventing backward rotation of the wheels when the lever and dog are carried backward, substantially as described.

20. In a cash register, the combination with indicating devices and rack mechanism for operating the same, of rotatable pin-carrying wheels, a rotatable shaft whereon they are loosely mounted, a sector gear 19 mounted on the shaft and other gearing which operatively connects it with the racks, such sector gear having an extension provided with a hook dog 20 adapted to engage a projected pin of an adjacent pin-wheel, whereby when the pin wheel is rotated forward, the sector gear is carried with it and thus operates the rack mechanism, a lever 17 keyed on the aforesaid shaft and provided with an arm adapted for engagement with the hook dog whereby when said lever 17 is moved backward, the hook dog is disengaged from the pin-wheel and, together with the sector gear, is carried back to normal position whereby the rack mechanism and the indicating devices are also restored to their original position, substantially as described.

21. In a cash register, the combination with an indicating device, a rotatable pin-carrying wheel, a shaft whereon the wheel is loosely mounted, means for operating said shaft and forming a part of the operative mechanism of the machine, a lever arm 17 keyed on the shaft and provided with a dog 18 adapted to engage a pin projected from the wheel and having also an arm 22 carrying a pin at its extremity, a sector gear 19 mounted loose on the shaft and provided with a pivoted hook dog 20 having a hook portion 20$^a$ adapted to engage a projected pin of the wheel so as to be carried with the latter as it rotates forward and also adapted for engagement with the pin of the lever 17 when the latter makes its backward movement, substantially as described.

22. In a cash register, the combination with indicating devices, and a rotatable pin-carrying wheel, and means for operatively connecting it with said devices, a rotatable shaft whereon the pin-wheel is mounted and means for operating the same, of a lever 17$^a$ keyed on the shaft, and provided at its outer end with a lateral extension 17$^b$ having its free terminal portion bent inward and inclined laterally at an angle to the body or shank of said lever, thereby forming a cam 17$^c$, a rocking lever key 82 mounted on the shaft of the pin wheel and provided with a parallel arm 86 which is constructed of spring material and adapted to yield laterally when acted upon by the cam, whereby said arm is caused to project a pin on the adjacent wheel, as shown and described.

23. In a cash register, the combination with indicating mechanism and printing mechanism of a rocking crank shaft 9 and means for operatively connecting it with both mechanisms, and means controlled by the operator of the machine for rocking the said shaft which includes a rotatable member and a slotted pitman 12 pivoted on the crank and having a yielding connection with the rotatable member, whereby the latter is allowed to complete its rotation after the crank has come to rest, substantially as described.

JOHN F. PARKER.

Witnesses:
SOLON C. KEMON,
AMOS W. HART.